United States Patent
Katagiri et al.

(10) Patent No.: US 7,316,882 B2
(45) Date of Patent: Jan. 8, 2008

(54) IMAGE FORMING METHOD

(75) Inventors: Yoshimichi Katagiri, Kawasaki (JP); Yasushige Nakamura, Kawasaki (JP); Katsuji Ebisu, Kawasaki (JP); Yuzo Horikoshi, Kawasaki (JP); Takahiro Kashikawa, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/259,649

(22) Filed: Sep. 30, 2002

(65) Prior Publication Data
US 2003/0203304 A1 Oct. 30, 2003

(30) Foreign Application Priority Data
Mar. 29, 2002 (JP) ............................. 2002-097182

(51) Int. Cl.
*G03G 13/20* (2006.01)
(52) U.S. Cl. ............... 430/124.4; 430/45.1; 430/45.51; 430/107.1; 430/108.1; 430/111.4; 430/123.5; 430/123.52
(58) Field of Classification Search ............ 430/108.1, 430/107.1, 45, 124, 111.4, 45.1, 45.51, 123.5, 430/123.52, 124.4
See application file for complete search history.

(56) References Cited

U.S. PATENT DOCUMENTS

| 2,297,691 A | 10/1942 | Carlson | |
| 6,555,280 B2 * | 4/2003 | Horikoshi et al. | 430/108.21 |
| 6,593,050 B2 * | 7/2003 | Katagiri et al. | 430/108.23 |
| 6,641,965 B2 * | 11/2003 | Nakamura et al. | 430/107.1 |

FOREIGN PATENT DOCUMENTS

| JP | 61-132959 | 6/1986 |
| JP | 6-118694 | 4/1994 |
| JP | 6-348056 | 12/1994 |
| JP | 7-191492 | 7/1995 |
| JP | 2000-147824 | 5/2000 |

OTHER PUBLICATIONS

USPTO Trademark Electronic Search System (TESS) printout of Aug. 30, 2005, for the trademark Henschel Mixer, Serial No. 7559986.*

* cited by examiner

*Primary Examiner*—Janis L. Dote
(74) *Attorney, Agent, or Firm*—Westerman, Hattori, Daniels & Adrian, LLP

(57) ABSTRACT

The present invention provides an image forming method for obtaining excellent color fixed images with a smaller amount of light energy. This image forming method includes the steps of: forming a toner layer of a color toner containing at least a binder resin, a coloring agent, and an infrared absorbent, on a recording medium; and fixing the toner layer by flashlight emission, where the relationship among the PAS level S of the color toner that is obtained by integrating an infrared PAS spectrum obtained through PAS (photoacoustic spectroscopy) analysis in the range of 800 nm to 2000 nm, the melt viscosity ρ of the color toner at a reference temperature, and the energy E of the flashlight, is expressed by the following relational expression:

$$1000 \leq \rho/E \cdot S \leq 5500.$$

5 Claims, 5 Drawing Sheets

IMAGE FORMING METHOD

BACKGROUND OF THE INVENTION

The present invention generally relates to color toners and image forming methods, and, more particularly, to a color toner used for image formation using a technique such as electrophotography and a method of forming an image on a recording medium with the color toner. Furthermore, the present invention relates to a color toner that is fixed onto a recording medium by the light energy originating from flashlight, and an image forming method using the color toner.

Electrophotography is a technique widely used for image forming apparatuses such as copying machines, electrophotographic facsimile machines, and electrophotographic printers. As disclosed in U.S. Pat. No. 2,297,691, an electrophotographic technique using a photoconductive insulating body has been widely used. According to this technique, an electrostatic latent image is formed by emitting light, such as laser or LED, onto a photoconductive insulating body charged by corona discharge or a charge supply roller. Resin particles called toner that is colored with pigments or dyes (coloring agents) are electrostatically fixed to the electrostatic latent image to carry out a development to obtain a visible toner image. This toner image is then transferred onto a recording medium such as paper or film. At this point, the toner image is only placed on the recording medium, and, therefore, needs to be fixed to the recording medium. Accordingly, the toner is melted on the recording medium by heat, pressure, or light, and are then solidified. Thus, a toner image fixed onto the recording medium can be obtained.

As described above, the toner fixing is carried out by melting a toner mainly made up of thermoplastic resin (hereinafter referred to as "binder resin") and then fixing the melted toner onto the recording medium. Well-known examples of such toner fixing methods include a heat-roll technique in which a recording medium having a toner image formed thereon is heated and pressurized directly by a heated roller, and a flash fixing technique in which the toner is fixed onto a recording medium by flashlight from a xenon flash tube, for instance.

According to the flash fixing technique, the toner is melted and fixed onto a recording medium by converting light energy originated from flashlight of a discharge tube such as a xenon flash tube into thermal energy.

This flash fixing technique has advantages over the heat-roll technique in an image forming apparatus. The advantages include: (1) the resolution of a toner image formed on a recording medium does not deteriorate by the non-contact fixing; (2) no warm-up time is necessary for the image forming apparatus, and an image forming operation can be promptly started; and (3) the fixing can be carried out on recording media of any material or thickness, such as adhesive paper, pre-printed paper, and paper having various thicknesses (where the thickness varies stepwise).

The process of fixing a toner onto a recording medium by flashlight are as follows. Flashlight emitted from a discharge tube is absorbed by a toner image (a particle image) formed on the recording medium, and is then converted into thermal energy. The toner is heated up accordingly, and is melted. As a result, the toner adheres to the recording medium. After the end of the flashlight emission, the temperature drops, and the melted toner solidifies to form a fixed toner image.

Preferable conditions for carrying out the flash fixing includes:

1) The toner is capable of efficiently converting light energy into thermal energy, 2) The material of the toner can melt with heat and turn into a melted state that is permeable to the recording medium, and 3) Little energy is lost on anything other than the melting of the toner material. (For instance, energy loss due to heat absorption by the recording medium is not desirable.)

However, a xenon flash tube that is generally used as a discharge tune for flash fixing emits light over a wide wavelength range of 400 nm to 2000 nm. Compared with light in the visible range of 400 nm to 800 nm, the luminescence intensity in the near-infrared range of 800 nm to 2000 nm in wavelength, especially in the range of 800 nm to 1400 nm, is very high. For this reason, the toner on which flash fixing is to be carried out is required to have a high light absorptivity for light in the near-infrared range of 800 nm to 2000 nm in wavelength, especially in the 800 nm to 1400 nm range.

However, binder resin that is the main component of a toner generally has a very low light absorptivity in the visible range and the near-infrared range. When the coloring agent is black, the toner exhibits a high light absorptivity in the visible range and the near-infrared range. When the coloring agent is for a color, such as yellow, cyan, magenta, red, blue, or green, the toner exhibits an acceptable light absorptivity in the visible range, but has only a low light absorptivity in the near-infrared range. This implies that a color toner has a poor light-to-heat conversion efficiency.

For the above reasons, it is difficult to fix a color toner containing binder resin and coloring agents by flashlight of such intensity as to fix a black toner. Color toner fixing therefore requires the supply of strong light energy.

There have been techniques of adding an infrared absorbent having a high light absorptivity in the light emission wavelength range of a xenon flash tube to a color toner, so that the required amount of light energy for fixing the color toner onto a recording medium by flashlight can be reduced. For instance, Japanese Laid-Open Patent Application Nos. 61-132959, 6-118694, 7-191492, and 2000-147824 each disclose a technique of adding an aminium compound, a diimonium compound, or a naphthalocyanine compound to a toner for flash fixing. Japanese Laid-Open Patent Application No. 6-348056 discloses a technique of applying resin particles containing an infrared absorbent containing anthraquinone dye, polymethine dye, or cyanine dye, to the toner surface. Japanese Laid-Open Patent Application No. 10-39535 further discloses a technique of increasing the fixability of a color toner with flashlight by adding tin oxide or indium oxide to the color toner.

In the above disclosed techniques, an infrared absorbent is added to a color toner, so as to promote the efficiency of converting light energy into thermal energy, and to increase the meltability of the binder resin as the main component of the color toner.

However, the addition of an infrared absorbent is not enough to solve the problem, i.e., not enough to melt the binder resin contained in a toner. Also, the aminium compound, the diimonium compound, and the naphthalocyanine compound used as the preferred infrared absorbent is colored, and a large amount of those compounds will have adverse influence on a fixed color image. Accordingly, it is preferable to use only a small amount of infrared absorbent.

As described so far, a large amount of light energy is still required for fixing a color toner by flashlight.

In an image forming apparatus that can form a color toner image, a plurality of color toners of different colors, instead of a single color toner, are used for twin-color image formation, multi-color image formation, or full-color image formation.

In twin-color image formation, multi-color image formation, and full-color image formation, a plurality of color toners and a black toner are simultaneously used. However, if the melt characteristics and light absorption characteristics greatly differs among the colors being simultaneously used, there is a problem that the glossiness of the image fixed by light varies with the color tones. If the characteristics differences are very large, some colors of the toner are insufficiently fixed while some other colors are sufficiently fixed. Furthermore, voids due to excessive absorption of light energy might lead to defects in a formed image.

SUMMARY OF THE INVENTION

A general object of the present invention is to provide color toners and image forming methods suitable for flash fixing in which the above disadvantages are eliminated.

A more specific object of the present invention is to provide a color toner suitable for flash fixing that enables excellent image formation with a smaller amount of light energy.

The color toner of the present invention can be used not only for electrophotographic image formation, but also for other image forming techniques, such as ionography and magnetography.

Another specific object of the present invention is to provide an image forming method that can form an excellent image by a technique, such as a sequential-development and sequential-fixing technique, or a sequential-development and batch fixing-technique. In this image forming method, the fixing conditions for preventing image defects and insufficient fixativity should be clearly specified to carry out image formation with a color toner of a plurality of colors suitable for flash fixing.

The above objects of the present invention are achieved by an image forming method that includes the steps of: forming a single toner layer on a recording medium, the single toner layer being of a color toner containing at least a binder resin, a coloring agent, and an infrared absorbent; and fixing the single toner layer by flashlight emission, where the energy of the flashlight being 0.5 to 2.5 $J/cm^2$, and the emission time of the flashlight being 500 to 3000 µs.

In the present invention, photoacoustic spectroscopy (PAS) analysis is carried out by emitting flashlight onto a sample and detecting periodic heat changes as changes in pressure caused in the sample. In this analysis, in-situ measurement can be made.

More specifically, infrared rays are first absorbed by the sample, generating heat corresponding to the incident rays. The generated heat causes a change in the pressure of the surrounding atmospheric layer, and the change is detected by a high-sensitivity microphone. The detected change is subjected to a Fourier transform so as to obtain the same spectrum as a normal infrared absorption spectrum.

The method in accordance with the present invention uses measurement results of the above described PAS analysis. In accordance with the present invention, excellent fixativity can be achieved when a color toner PAS level obtained by integrating an infrared spectrum obtained through the PAS analysis in the wavelength range of 800 nm to 2000 nm falls in the range of 0.01 to 0.2, with the PAS level of carbon black being 1.

A color toner having such a PAS level can be employed to reduce the required light energy for fixing. With such a color toner, fixing can be carried out with a light energy as small as or smaller than the energy of flashlight used in a conventional image fixing process using only a black toner.

The reason for limiting the integrating spectrum to the range of 800 nm to 2000 nm is that the luminescence intensity of a xenon flash tube is very high in this range, and that the light absorptive melt characteristics of a toner can be substantially controlled through measurement of the light absorption characteristics in this range.

If the PAS level is lower than 0.01, the light absorptivity of the color toner in the infrared range is low.

Accordingly, the light-to-heat conversion efficiency becomes low, and sufficient fixativity cannot be obtained unless strong flashlight is provided. However, employing a fixing unit that can provide the strong flashlight increases the size and price of the image forming apparatus. Furthermore, another toner such as a black toner involved in the image forming operation at the same time absorbs excessive light energy from the strong flashlight, resulting in an increase of fixing odor and image defects such as voids. Therefore, a PAS level lower than 0.01 is not considered to be acceptable.

If the PAS level of a color toner is higher than 0.2, sufficient fixativity can be obtained. However, the material costs of the color toner are increased, and the saturation of color images after fixing is reduced, because a large amount of infrared absorbent is required to increase the PAS level.

Therefore, a PAS level higher than 0.2 is not considered to be acceptable.

Judging from the above results, the PAS level ratio of a color toner to a black toner that is to be flash-fixed in the same image forming operation as the color toner should preferably be in the range of 0.2 to 0.9.

A color toner that satisfies the above conditions can achieve excellent fixativity, even when a plurality of toners including a black toner and a color toner are used in the same image forming operation.

The melt characteristics (or the fixing characteristics) of a toner in the toner fixing process in accordance with the present invention are determined by factors such as the amount of light energy, the light absorption characteristics of the toner, and the thermal melt characteristics (or the melt viscoelasticity) of the toner. Therefore, even if the light absorption characteristics of the toner are not in the preferable range, i.e., the PAS level is not in the preferable range, the fixing characteristics of the toner can be suitably adjusted by changing the light energy amount or the thermal melt characteristics of the toner.

To fix a color toner containing no infrared absorbents or having a very high PAS level by flashlight, a flash fixing unit that is capable of providing an extremely large amount of light energy should be employed, or/and the color toner should be made of a material that can melt with an extremely small amount of light energy. However, employing such a flash fixing unit increases the size, price, and power consumption of the image forming apparatus. Furthermore, such a flash fixing unit gives an excessive light energy to a toner such as a black toner having a higher PAS level that is being used in the same image forming operation. Such an excessive light energy causes image defects such as voids, as well as fixing odor and fuming. On the other hand, a color toner made of a material that can melt with an extremely small amount of light energy causes adhesion (or a spent phenomenon) of the toner to the developing process parts such as the developing roll or carrier in an image forming operation. As a result, not only the image formation performance deteriorates, but also the storing characteristics of the color toner and formed images deteriorate in terms of the heat and pressure resistance.

Where the amount of light energy of the fixing unit and the thermal melt characteristics of the toners are maintained in a manner that prevents the above problems, and where the PAS level ratio of the color toner to the black toner is 0.2 or smaller, a flash fixing process carried out with an energy that provides excellent fixativity for the black toner results in insufficient fixativity of the color toner. On the other hand, if a flash fixing process is carried out with a light energy that provides excellent fixativity for the color toner, excessive meltdown of the black toner is caused by the excessive light energy for the black toner, and the image quality is decreased with voids. As can be seen from the results, when the PAS level ratio of the color toner to the black toner is smaller than 0.2, it is difficult to achieve sufficient fixativity for both the color toner and the black toner. Therefore, the PAS level ratio of the color toner to the black toner to be fixed in the same image forming operation should be 0.2 or larger.

When the PAS level ratio of the color toner to the black toner is larger than 0.9, the amount of infrared absorbents added to the color toner to increase the PAS level is too large to achieve preferable image formation, though sufficient fixativity can be obtained for both the color toner and the black toner. The excessive addition of the infrared absorbents not only increases the costs of the color toner, but also reduces the saturation and causes changes (or turbidity) in the color tones of formed color images.

Meanwhile, the PAS level ratio of this color toner for flash fixing to another color toner to be fixed in the same image forming operation should preferably be in the range of 0.2 to 5.

The difference in the PAS level between the color toners may be eliminated by changing the thermal melt characteristics of the toner materials, so that the difference in the fixing characteristics between the toners are suitably adjusted. However, this causes the toner adhesion (the toner spent phenonmenon) to the processing parts and the problem in the storing characteristics as described above. For this reason, the adjustable PAS level difference is limited to a certain range. Accordingly, it is necessary to restrict the difference in the PAS level between two or more color toners used in the same image forming operation within the adjustable range.

According to the observation by the inventors, even after an optimum correction has been made to optimize the thermal characteristics of the toner materials, a flash fixing process carried out with a light energy suitable for fixing a color toner (Y) results in insufficient fixativity of another color toner (X), where the PAS level ratio of the color toner (X) to the color toner (Y) is 0.2 or smaller.

On the other hand, where the PAS level ratio of a color toner (Z) to the color toner (Y) is 5 or larger, a light energy suitable for fixing the color toner (Y) is excessive for the color toner (Z), and the image quality deteriorates with voids caused by excessive meltdown of the color toner (Z).

Accordingly, where the PAS level ratio of a color toner to another color toner is smaller than 0.2 or larger than 5, it is difficult to obtain sufficient fixativity for both color toners. Therefore, a PAS level outside the range of 0.2 to 5 should be considered to be unacceptable.

In accordance with the present invention, a color toner for flash fixing can contain two or more infrared absorbents having different light absorptivity spectrum in the wavelength range of 800 nm to 2000 nm.

Such a color toner has a higher light absorptivity in the wavelength range of 800 nm to 2000 nm, and a higher PAS level. Accordingly, excellent fixed images can be obtained with the color toner. Since each infrared absorbent has the absorption peak in a certain wavelength range, an increased addition of one infrared absorbent does not improve the efficiency in the use of light energy, and an excessive amount of one infrared absorbent causes the problems such as a decrease of the saturation of a fixed image. To avoid those problems, two or more infrared absorbents having different light absorption wavelength spectrum are added to a color toner to promote efficient light energy use. By doing so, problems such as image quality deterioration can also be avoided.

The infrared absorbent to be added to a toner may be formed by the combination of a first infrared absorbent (A) having the absorption peak in the wavelength range of 800 nm to 1100 nm, and a second infrared absorbent having the absorption peak in the wavelength range of 1100 nm to 2000 nm.

The infrared absorbent to be added to a color toner for flash fixing may also be formed by the combination of a first infrared absorbent (A) having the absorption peak in the wavelength range of 800 nm to 1100 nm, and a second infrared absorbent having the absorption peak in the wavelength range of 1100 nm to 2000 nm.

In this color toner for flash fixing, the first infrared absorbent (A) may be a naphthalocyanine compound, and the second infrared absorbent (B) may be an aminium compound or a diimonium compound.

Taking the above facts into consideration, the inventors provide an image forming method that includes the steps of: forming a single toner layer on a recording medium with a color toner containing at least a binder resin, a coloring agent, and an infrared absorbent; and fixing the single toner layer by flashlight emission, where the relationship between the PAS level S of the color toner obtained by integrating an infrared PAS spectrum through photoacoustic spectroscopy (PAS) analysis in the wavelength range of 800 nm to 2000 nm, and the energy E of the flashlight, is expressed by the relational expression (1) shown below. More preferably, the relationship between the PAS level S and the energy E should be expressed by the following relational expression (8):

$$0.03 \leq E \cdot S \leq 0.15 \tag{1}$$

$$0.10 \leq E \cdot S \leq 0.15 \tag{8}$$

By the above image forming method, excellent fixativity can be obtained, and color image formation having fewer voids can be achieved.

The relational expressions (1) and (8) imply that, even if the PAS level of a color toner is relatively low, excellent fixativity can be obtained as long as the flashlight energy is large, and that, if the flashlight energy is small, excellent fixativity cannot be obtained unless the PAS level of the color toner is increased.

Where a toner layer to be fixed is a single layer, fixativity is insufficient with a product E·S of smaller than 0.03. However, with a product E·S of larger than 0.15, excessive energy is given to the color toner, resulting in voids and a defective fixed image.

The reason for specifying the relationship between the PAS level S and the energy E by the relational expression (1) followed by the relational expression (8) is that the factors of a recording medium that affect the fixativity should be taken into consideration. More specifically, thermal energy converted from light energy through the absorption by a toner increases the temperature of the toner, and also is absorbed by a recording medium. If the same amount of energy is provided for two image forming operations using the same toner and different recording media, the fixing characteristics of the toner vary with the absorption characteristics of the recording media.

The inventors discovered that excellent fixed images can be obtained with smaller amounts of light energy by carrying out fixing processes in such a manner that the condition represented by the relational expression (1) should be satisfied when toner fixing is carried out onto a medium such as a thin film having a low heat absorptivity, and the condition represented by the relational expression (8) should be satisfied when toner fixing is carried out onto a medium such as a thick moisturized cardboard (having a ream weight of 210 kg, for example). To achieve excellent image formation, a color toner that satisfies those conditions should be employed.

Excellent flash fixing image formation can also be achieved by an image forming method that includes the steps of: forming a single toner image on a recording medium with a color toner that contains at least a binder resin, a coloring agent, and an infrared absorbent, and satisfies the above described conditions; and fixing the single toner layer by flashlight emission, where the energy of the flashlight is 0.5 to 2.5 J/cm², and the light emission time is 500 to 300 μs.

The type of toner layer formed on a recording medium is limited to a single-layer type in the above described cases. However, a sequential-development and batch-fixing process employed in tandem full-color printers involves batch fixing of a plurality of stacked toner layers (forming a particle image). In such a case, the uppermost toner layer that is farthest from the recording medium receives the strongest light energy, and each lower toner layer receives a weaker light energy than the layer located above the lower toner layer. As a result, the optimum fixing conditions in such a case are different from the above described conditions.

The optimum fixing conditions for the sequential-development and batch-fixing process will be specified later in detail.

On the other hand, in a sequential-development and sequential-fixing process employed in multi-stage image forming apparatuses, the developing and fixing procedure is repeated on an already developed and fixed toner layer. Accordingly, excellent image formation can be achieved under the conditions represented by the relational expressions (1) and (8).

Taking the above facts into consideration, the objects of the present invention are also achieved by an image forming method that includes the steps of: forming a toner layer on a recording medium, the toner layer being of a color toner containing at least a binder resin, a coloring agent, and an infrared absorbent; and fixing the toner layer by flashlight emission, where the relationship among the PAS level S of the color toner that is obtained by integrating an infrared PAS spectrum obtained through photoacoustic spectroscopy analysis in the range of 800 nm to 2000 nm, the melt viscosity ρ of the color toner at a reference temperature, and the energy E of the flashlight, is expressed by the following relational expression (2):

$$1000 \leq \rho/E \cdot S \leq 5500 \tag{2}$$

By this method, excellent image formation can be carried out with suitable light fixing, whether the toner layer is in a single-layer state or a multi-layer state.

The above objects of the present invention are also achieved by an image forming method for performing image forming operations using flash-fixable color toners each containing at least a binder resin, a coloring agent, and an infrared absorbent, the method including the steps of: carrying out development and flash fixating for a first toner; and repeating the step of development and flash fixing n−1 times for second through nth toners, thereby carrying out sequential development and sequential fixing, where the relationship among the PAS level $S_X$ of the toner used in an Xth step of development and flash fixing, the melt viscosity $\rho_X$ of the toner at a reference temperature, and the energy $E_X$ of the flashlight, is expressed by the following relational expression (3):

$$4950 \geq \rho_{X-1}/E_{X-1} \cdot S_{X-1} \geq \rho_X/E_X \cdot S_X \geq 1150$$

and $$E_{X-1} \geq E_x \tag{3}$$

By this method, the fixing conditions can be set so that a toner to be fixed before the other toners melts more easily than the other toners, and occurrence of voids can be prevented.

In the relational expression (3), $S_X$ represents the PAS level of the toner used in the Xth image forming and fixing step, $\rho_X$ represents the melt viscosity (unit: Pa·S) of the toner at the reference temperature, and $E_X$ represents the energy (unit: J/cm²) of the flashlight for fixing the toner in the flash fixing step.

The reference temperature for measuring the melt viscosity of the toner is preferably 125° C., because a temperature of 125° C. is suitable as a melt viscoelasticity temperature value in the measurement of toner fixing characteristics in a flash fixing process, as disclosed in Japanese Patent No. 2,501,938.

The above relational expression is formed by factors related to the toner melt characteristics in the fixing step. The denominator $E_X \cdot S_X$ represents the heating characteristics (light-to-heat conversion energy) of the toner subjected to the flashlight in the fixing step, and the numerator $\rho_X$ represents the Rheology characteristics of the melted toner.

If the denominator is too small for the numerator, the melting of the toner becomes insufficient for fixing onto the recording medium. On the other hand, if the denominator is too large for the numerator, the melting of the toner becomes excessive, resulting in image defects such as voids.

Also, it is not preferable for the light emission energy of a latter fixing step to become too large for the light emission energy of the previous fixing step. The toner fixed in the previous fixing step normally exhibits optimum fixing characteristics with the light emission energy in the previous fixing step. If the light emission energy of the latter fixing step is excessively larger than the light emission energy of the previous fixing step, the melting of the toner subjected to the light emission of the latter fixing step becomes excessive, often resulting in image defects such as voids.

The above facts imply that a toner having a relatively high PAS level such as a black toner should be formed by toner materials that exhibit a high melt viscoelasticity, and that a color toner having a low color agent infrared absorptivity and a relatively low PAS level should be formed by toner materials that exhibit a low melt viscoelasticity. In this manner of toner formation, the fixing characteristics can be easily balanced among the toners.

In accordance with the observation by the inventors, a toner image formed by a first developing and fixing procedure might be softened or melted again, depending on the energy amount of the flashlight emitted in a second fixing procedure. If the energy amount of the flashlight in the second fixing procedure is excessive for the toner used in the first image forming operation, image defects such as voids are caused in the image formed by the first image forming operation.

To avoid this problem, it is desirable to set the values of $\rho_X/E_X \cdot S_X$ in such a manner that toners and image forming units involved in earlier image forming operations have the smaller $\rho_X/E_X \cdot S_X$ values in sequential image forming operations performed by an image forming apparatus of sequential-development and sequential-fixing.

On the other hand, in flash-fixing image forming operations involving sequential-development and batch-fixing, after the development of a first toner, the developing step is repeated n−1 times to develop second to nth toners, so that n stacked toner layers are sequentially formed on a recording medium, starting from the toner layer closest to the recording medium. After that, all the n stacked toners are fixed at once. In the sequential-development and batch-fixing image forming operations, balanced toner characteristics and image formation can be achieved by the following settings:

1) A toner binder having a high melt rheology should be added to a toner having a high PAS level;

2) The PAS level ratio of a color toner to the black toner to be fixed in the same fixing step should be in the range of 0.2 to 0.9; and 3) The PAS level ratio of a color toner to another color toner to be fixed in the same fixing step should be in the range of 0.2 to 5.

Taking the above points of view, including the toner rheology characteristics, into consideration, the objects of the present invention are also achieved by an image forming method for performing image forming operations using flash-fixable color toners each containing at least a binder resin, a coloring agent, and an infrared absorbent, the method including the steps of: developing a first toner; repeating the developing step n−1 times to develop second through nth toners, thereby forming first through nth toner layers on a recording medium; and flash-fixing the n toners at once, thereby completing sequential development and batch fixing, where the relationship among the PAS level $S_Y$ of the toner forming a Yth toner layer counted from the recording medium side, the melt viscosity $\rho_Y$ of the toner at a reference temperature, and the energy E of the flashlight, is expressed by the following relational expression (4):

$$4000 \geq \rho_Y/S_Y \cdot E \geq 1000 \qquad (4)$$

The objects of the present invention are also achieved by an image forming method for performing image forming operations using flash-fixable color toners each containing at least a binder resin, a coloring agent, and an infrared absorbent, the method including the steps of: developing a first toner; repeating the developing step n−1 times to develop second through nth toners, thereby forming first through nth toner layers on a recording medium; and flash-fixing the n toners at once, thereby completing sequential development and batch fixing, where the relationship among the PAS level $S_Y$ of the toner forming a Yth toner layer counted from the recording medium side, the melt viscosity $\rho_Y$ of the toner at a reference temperature, and the energy $E_Y$ of the flashlight, is expressed by the following relational expression (5):

$$4000 \geq \rho_{Y-1}/S_{Y-1} \cdot E \geq \rho_Y/S_Y \cdot E \geq 1000$$

and $$S_{Y-1} \geq S_Y \qquad (5)$$

By either of the above methods, the lower toner layer having a higher meltability increases uniformity of the melting of the toner in the batch fixing step, and prevents uneven fixing. Thus, excellent coloring can be achieved. Especially, the latter method is more preferable, because the lowest toner layer has the highest light energy absorptivity.

In the relational expression (5), $S_Y$ represents the PAS level of the toner of the Yth layer counted from the recording medium side, $\rho_Y$ represents the melt viscosity of the toner at the melting point, and E represents the energy of the flashlight in the fixing step.

In a sequential-development and batch-fixing operation, flashlight is emitted on stacked toner layers. The toner layer farthest from the recording medium (i.e., the uppermost layer) receives the largest light energy, and the lower toner layers receive gradually reducing light energies. Accordingly, the toner layer closest to the recording medium (i.e., the lowermost layer) receives the smallest light energy.

If the value obtained by dividing the rheology of a toner at a reference temperature (125° C., for example) by the PAS level of the toner and the energy E of the light emission is 1000 or smaller, the melting of the toner becomes excessive, and image defects such as voids are caused. On the other hand, if this value is 4000 or larger, the melting of the toner becomes insufficient, resulting in defective fixing.

As long as the value obtained by dividing the rheology of the toner at 125° C. by the PAS level of the toner and the light emission energy E is in the range of 1000 to 4000, there are no problems with the toner fixativity. Even if there is a difference in the receiving amount of light energy between the uppermost toner layer and the lowermost toner layer, excellent fixing can be achieved, because the uppermost toner suitably having a high heat absorptivity transfers the heat to the lower layers at the time of melting.

However, where a lower toner layer is melted by the heat transmission from an upper toner layer, there is a certain time lag in melting between the upper toner layer and the lower toner layer. Especially, by the time when the lowermost toner layer is melted, the uppermost toner layer, from which the heat has been taken away by its surroundings, might be already beginning to cool down.

To obtain an excellent full-color image with a wide color reproduction range, it is necessary to uniformly mix the stacked toner layers of yellow, magenta, and cyan in a melted state.

With the above described time lag, however, the uniform mixing is difficult to achieve, and the color reproduction range becomes narrow.

To eliminate this problem, a lower toner layer should have a higher meltability than an upper toner layer, as expressed by the relational expression (5).

To control the characteristics of each color toner so as to satisfy the relational expressions (1) through (5) while minimizing the influence on the characteristics of the toner such as charge characteristics, solid materials that are insoluble with the binder resin contained in the toners and have different specific surface areas should be used as the infrared absorbents to be added to the toners. By doing so, the light absorption characteristics of each toner can be desirably controlled, without making remarkable changes to the materials and the adding amounts of the infrared absorbents to be added to the toners.

The relational expressions (1) through (5) can be satisfied by an image forming method that includes the step of flash-fixing color toners, where at least one infrared absorbent contained in the flash-fixable color toner is insoluble in the binder resin, and the specific surface area Su of the infrared absorbent added to the toner used in the nth developing step satisfies the following relational expression:

$$Su_{n-1} \geq Su_n \quad (6)$$

The objects of the present invention are also achieved by an image forming method for performing image forming operations using flash-fixable color toners each containing at least a binder resin, a coloring agent, and an infrared absorbent the method that includes the steps of: forming n toner layers on a recording medium; and flash-fixing the n toner layers formed on the recording medium, where the PAS level $S_Z$ of the toner forming a Zth toner layer counted from the recording medium side and the covering power $C_Z$ of the Zth toner layer image satisfy the following relational expression:

$$S_{Z-1} \geq S_Z \text{ and } C_{Z-1} \geq C_Z \quad (7)$$

The inventors believe that, in either a sequential-development and sequential-fixing image forming operation or a sequential-development and batch-fixing image forming operation, the conditions expressed by the relational expression (7) should be satisfied to secure a wide full-color reproduction range.

By the above method, the following effects can be expected:

1) Light energy emitted onto stacked toner layers (a particle image) easily reaches the lowermost toner layer, as the upper toner layers have lower covering powers. Accordingly, sufficient melting can be obtained even for the lowermost toner layer. As a result, the toner layers including the uppermost and lowermost toner layers are uniformly mixed, and a wider color reproduction range can be obtained.

Even in a sequential-development and sequential-fixing image forming operation, the lower toner layers that have already been melted can be melted repeatedly, as the upper toner layers have lower covering powers (or high transmission rate). Accordingly, the toner layer including the uppermost and lowermost toner layers are uniformly mixed, and a wider color reproduction range can be obtained.

2) As the lower toner layers among stacked toner layers have higher light absorptivities and melt with a smaller amount of heat, preferable melt characteristics can be maintained, even though the upper toner layers absorb light and thus diminishes the light energy to be transmitted to the lower toner layers. Accordingly, the toner layers including the uppermost and lowermost toner layers can be uniformly mixed, and a wider color reproduction range can be obtained.

3) Even if strong light is emitted onto a toner image so as to melt the lowermost toner layer that is to receive only a diminished light energy, excessive meltdown of the toners can be prevented by the upper toner layers of low light absorptivity and/or high melt viscoelasticity. Thus, image defects such as voids can be effectively reduced.

The above and other objects and features of the present invention will become more apparent from the following description taken in conjunction with the accompanying drawings.

DESCRIPTION OF THE PREFERRED EMBODIMENTS

Figure 1:
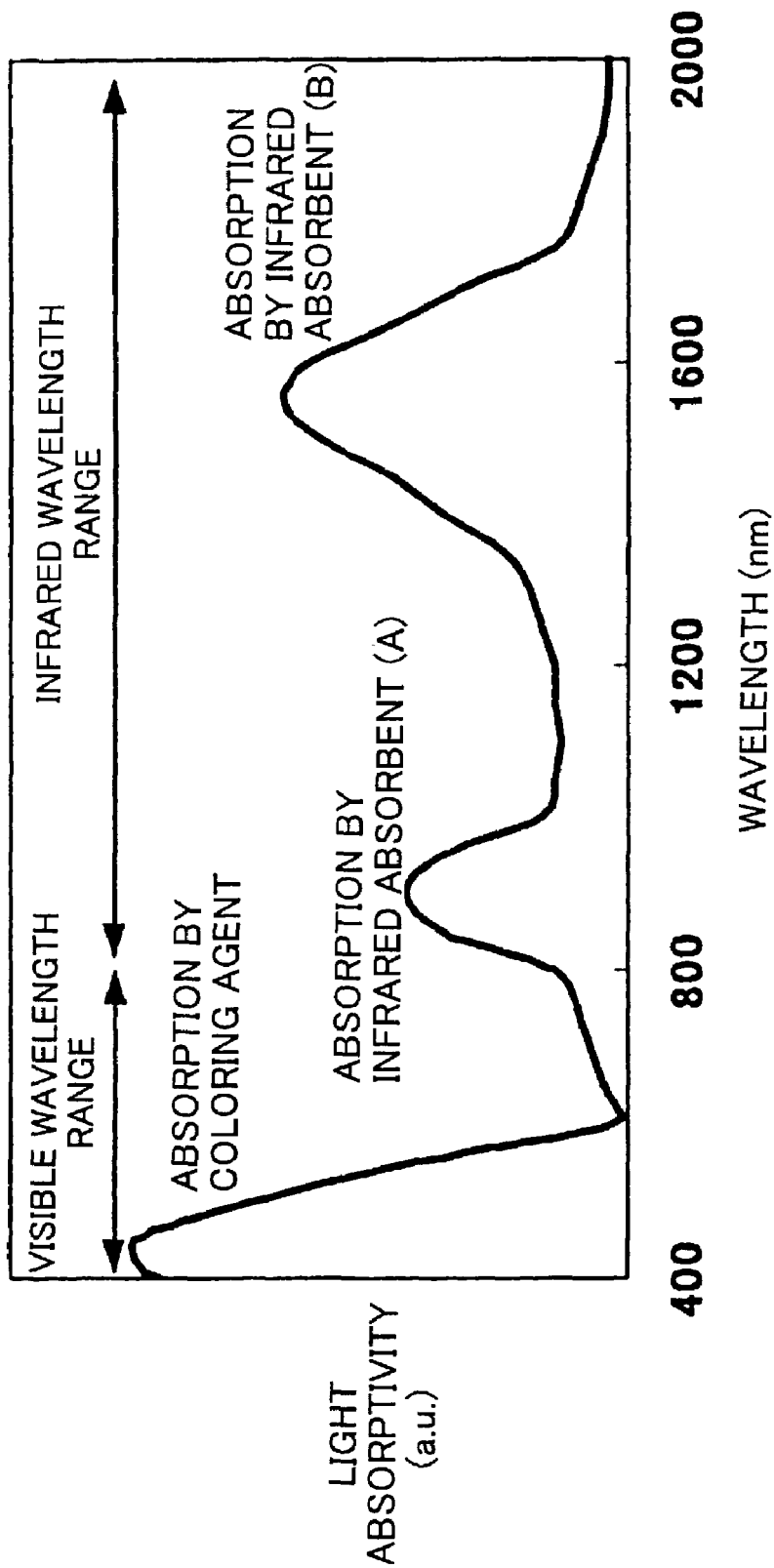
FIG. 1 illustrates the characteristics of the light absorptivity of a color toner (a red toner) that is an embodiment of the present invention.

The following is a description of embodiments of the present invention, with reference to the accompanying drawings.

A color toner suitable for light emission fixing in accordance with the present invention at least contains binder resin, a coloring agent, and an infrared absorbent. The color toner has a PAS (Photoacoustic Spectroscopy) intensity within the range of 0.01 to 0.2, where the PAS level of carbon black is 1. The PAS level is obtained by integrating an infrared PAS spectrum obtained through photoacoustic spectroscopy analysis in the range of 800 nm to 2000 nm. This color toner can be preferably used in image forming apparatuses such as copying machines, printers, and facsimile machines, each of which employs a method of forming images with toner by an electrophotography technique, or ionography technique, or a magnetography technique.

The method of measuring the PAS level of the above toner will be described later in conjunction with the other measuring methods used in the following embodiments.

In the fixing unit of an image forming apparatus, the infrared absorbent has a function of converting light energy of flashlight into thermal energy. The infrared absorbent is originally added to the color toner to facilitate the meltdown of the binder resin. An infrared absorbent normally absorbs light of 800 nm to 2500 nm in wavelength to convert light energy into thermal energy. For instance, a naphthalocyanine compound that is preferable for the color toner of this embodiment absorbs infrared rays of 800 nm to 1100 nm in wavelength.

The inventors made intensive studies to search for an infrared absorbent that can absorb light in the 800 nm to 2500 nm wavelength range, more preferably in the 800 nm to 2000 nm wavelength range, but failed to find an infrared absorbent that exhibits a light absorptivity in such a wide wavelength range. This led to a conclusion that a color toner cannot have a sufficient fixativity with only a single infrared absorbent, unless the single infrared absorbent is added in so large quantities as to provide a very high concentration.

The inventors, however, found out that dividing the wide wavelength range could increase the fixativity of the color toner even with a smaller amount of light energy and a low infrared absorbent concentration. For instance, the wavelength range can be divided by the combined use of a first infrared absorbent (A) having the absorption peak in the 800 nm to 1100 nm wavelength range, and a second infrared absorbent (B) having the absorption peak in the 1100 nm to 2000 nm wavelength range.

The PAS level of such a color toner obtained by integrating the infrared PAS spectrum in the 800 nm to 2000 nm range is 0.01 to 0.2, where the PAS level of carbon black is 1.

In the fixing unit of an image forming apparatus that carries out color image formation, a black toner and the color toner are simultaneously used and fixed for the image formation. In such a case, the PAS level of the color toner should be set 0.2 to 0.9 times higher than the PAS level of the black toner, so that the amount of light energy required for flash fixing can be reduced while the color toner and the black toner can be efficiently fixed in a preferable condition.

Further, in the fixing unit of an image forming apparatus that carries out color image formation, a color toner (red, for example) and another color toner (blue, for example) are simultaneously fixed. In such a case, the PAS level of one of the color toners should be set 0.2 to 5 times higher than the PAS level of the other color toner, so that each color toner can be efficiently fixed with a small amount of light energy while problems such as a defective image or insufficient fixativity due to excessive meltdown.

The color toner of the present invention can be used for mono-color image forming apparatuses and color image forming apparatuses for twin-color image formation, multi-color image formation, and full-color image formation, which are either of a sequential-development and sequential-fixing type or a sequential-development and batch-fixing type.

When an image is formed with the color toner of the present invention by a sequential-development and sequential-fixing technique, the relationship value $\rho/E \cdot S$ of the conditions for the toner and the fixing unit used in a previous development and fixing process, and the value E, should be set equal to or greater than the relationship value $\rho/E \cdot S$ of the conditions for the toner and the fixing unit used in a latter development and fixing process, and the value E, respectively. By doing so, excessive meltdown of the toner fixed in the previous process can be prevented in the latter process, and excellent image formation can be carried out.

Here, $\rho$ represents the melt viscoelasticity of each toner to be fixed in the fixing process, E represents the amount of light energy of light emitted onto the recording medium, and S represents the PAS level of the toner in the 800 nm to 200 nm wavelength range.

If the sequential-development and batch-fixing technique is employed for image formation, the closer it gets to the recording medium, the smaller the value $\rho/S$ is set among the toner layers stacked on the recording medium. In this manner, the mixing of each toner is relatively uniformly carried out in the toner fixing process. This is advantageous in that an excellent color reproduction range can be ensured, and excellent image formation characteristics can be obtained.

In each of the above processing techniques, to control the PAS level of each toner, a solid infrared absorbent that is insoluble with the binder resin is selected as the infrared absorbent contained in each toner, and the specific surface area of the infrared absorbent is set as a factor for adjusting the PAS level of each toner. In this manner, the influence of each toner on the other toners can be minimized, and the PAS level of each toner can be adjusted in relation to the other toners.

When image formation is carried out by laminating multi-color toner layers on a recording medium, the farther it gets from the recording medium among the toner layers, the lower a covering power a toner should have. Also, the closer it gets to the recording medium among the toner layers, the higher a meltability the toner should have (i.e., the toner has a high light energy absorption efficiency, and can be melted with a small quantity of heat). In this manner, image formation with a wide color reproduction range can be carried out.

A toner having the above predetermined relationship with respect to the PAS level can be produced by suitably adjusting the color toner of the present invention that contains at least two infrared absorbents of different absorption wavelength spectrums in the 800 nm to 2000 nm wavelength range.

Figure 2:
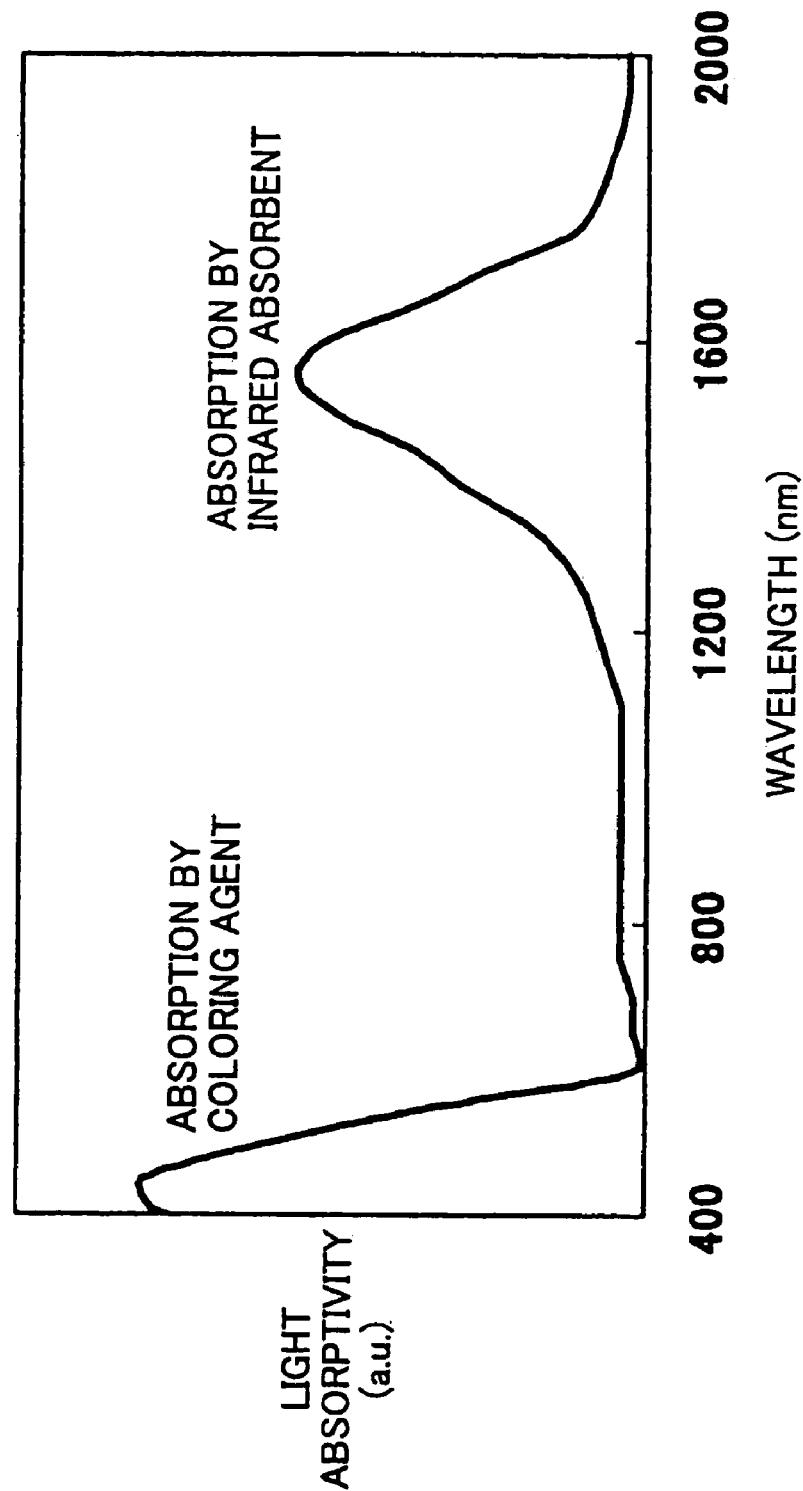
FIG. 2 shows the characteristics of the light absorptivity of a conventional color toner (a red toner) to which an infrared absorbent is added.

FIG. 1 illustrates the characteristics of the light absorptivity of a color toner (a red toner) that is an embodiment of the present invention. FIG. 2 illustrates the characteristics of the light absorptivity of a conventional color toner (a red toner) to which only one infrared absorbent is added.

Since the color toner contains a first infrared absorbent (A) having the absorption peak in the 800 nm to 1100 nm wavelength range, and a second infrared absorbent (B) having the absorption peak in the 1100 nm to 2000 nm wavelength range, two absorption peaks are shown in FIG. 1. This proves that the color toner efficiently uses infrared rays.

On the other hand, the conventional color toner has only one absorption peak formed in the infrared range, as shown in FIG. 2. This proves that the conventional color toner does not efficiently use infrared rays. To heighten the only one peak, it is necessary to prepare the infrared absorbent in large quantities.

As for the first infrared absorbent (A) that can be used for the color toner of the present invention, a naphthalocyanine compound is one of the most preferable materials. As for the second infrared absorbent (B), an aminium compound or a diimonium compound can be employed as one of the most preferable materials.

The naphthalocyanine compound can be expressed by the following general formula:

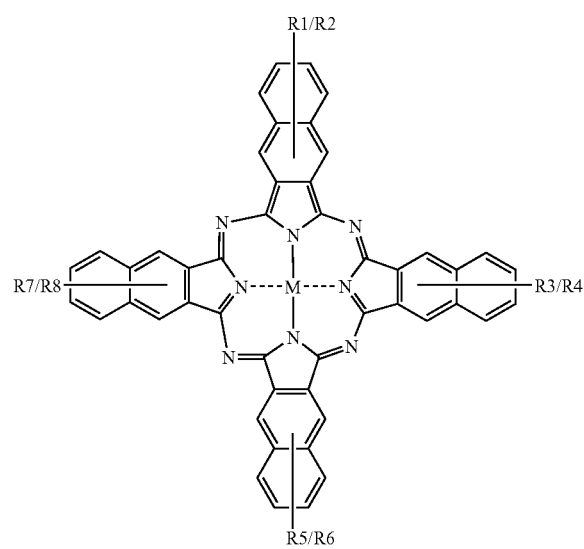

wherein R1 through R8 represent the substituents that are attached to the naphthalene ring, more specifically, saturated or unsaturated hydrocarbon radicals of hydrogen and carbon number of 1 to 18, or oxygen and/or nitrogen containing hydrocarbon radicals of carbon number of 1 to 13, and Ms represent hydrogen diatoms or two hydrogen atoms, bivalent metals, or trivalent or tetravalent metal derivatives.

The aminium compound can be expressed by the following general formula:

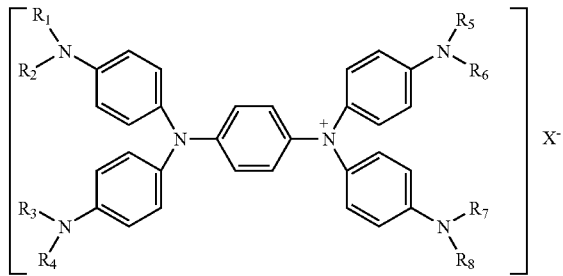

wherein R1 through R8 each represent a hydrogen atom, a halogen atom, an alkyl group, an aryl group, an alkoxy group, a nitro group, or a carboxyl group, and $X^-$ represents an anion.

The diimonium compound is expressed by the following general formula:

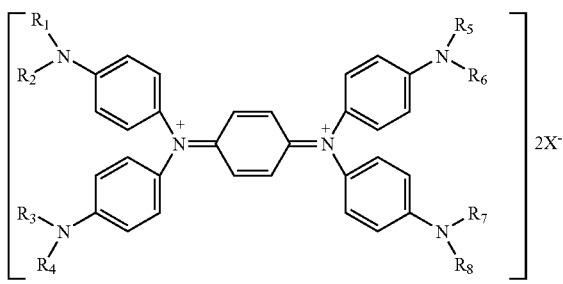

wherein R1 through R8 each represent a hydrogen atom, a halogen atom, an alkyl group, an aryl group, an alkoxy group, a nitro group, or a carboxyl group, and $X^-$ represents an anion.

Other than the above compounds, examples of infrared absorbents further include a polymethine compound, a cyanine compound, an anthraquinone compound, a phthalocyanine compound, a metal complex compound such as a dithiol-nickel complex or an azo cobalt complex, a squalirium compound, a lanthanoid compound such as tin oxide, ytterbium oxide, or phosphorylated ytterbium, and indium-tin oxide. However, the infrared absorbents used for the color toner of the present invention is not limited to these examples.

It is preferable to employ two or more of the above examples of infrared absorbents. It is even more preferable to select an infrared absorbent having the absorption peak in the 800 nm to 1100 nm wavelength range, and an infrared absorbent having the absorption peak in the 1100 nm to 2000 nm wavelength range.

The total proportion of the infrared absorbents to be added to the color toner of the present invention is preferably 0.1 to 10 parts by weight, or more preferably, 0.1 to 3 parts by weight, per 100 parts by weight of the color toner.

As described before, if the amount of infrared absorbents to be added is too large, the hue of a fixed toner image greatly changes from the original hue of the coloring agent, resulting in poor saturation of the image. To avoid such a problem, the color toner of the present invention aims to restrict the addition of infrared absorbents to a smaller amount than in the prior art. To obtain a sufficient infrared light absorptivity with only one infrared absorbent, it is necessary to add the infrared absorbent in large quantities. This leads to the above described problem of image deterioration after fixing. Instead, the combined use of two or more infrared absorbents having different absorption wavelength spectrum can increase the infrared light absorptivity with a smaller total amount of infrared absorbents than the necessary amount of one infrared absorbent in the prior art. Furthermore, since different infrared absorbents have different colors, the problem of image deterioration (color turbidity) after fixing can be eliminated.

Various types of conventional thermoplastic resin can be used as the binder resin contained in the color toner of the present invention. For instance, one or a combination of resins having a glass transition point of 40° C. to 80° C. and a softening point of 80° C. to 140° C., such as epoxy resin, styrene-acrylic resin, polyamide resin, polyester resin, polyvinyl resin, polyurethane resin, polybutadiene resin, phenol resin, acrylic resin, methacrylic resin, polyvinyl acetate resin, silicone resin, furan resin, xylene resin, polyvinyl butyral resin, terpene resin, coumarone-indene resin, petroleum resin, and polyether-polyol resin, can be used as the binder resin contained in the color toner of the present invention. If necessary, wax, such as carnauba wax, montan wax, polyethylene, amides, ester, or polypropylene, may be added to the binder resin.

The coloring agents contained in the color toner of this embodiment are not particularly limited, and any known coloring agent can be used. For instance, carbon black, lamp black, iron black, ultramarine blue, a nigrosine dye, aniline blue, a monoazo red pigment, a disazo yellow pigment, quinacridone, a condensed azo compound, an isoindolynone compound, an azo metal complex, a methine compound, an arylamide compound, a copper phthalocyanine compound and its derivatives, an anthraquinone compound, and a basic dye compound, can be used as the coloring agents in the color toner of the present invention. Any combination of those pigments and dyes can also be employed.

More specific examples of the coloring agents contained in the color toner of the present invention include Aniline Blue (C.I. No. 50405), Chalco Oil Blue (C.I. AZOIC BLUE 3), Chrome Yellow (C.I. No. 14090), Ultra Marine Blue (C.I. No. 77103), DuPont Oil Red (C.I. No. 26105), Quinoline Yellow (C.I. No. 47005), Methylene Blue Chloride (C.I. No. 52015), Phthalocyanine Blue (C.I. No. 74160), Malachite Green Oxalate (C.I. No. 42000), Food Red 2 (AMARANTH, C.I. No. 16185), Food Red 3 (ERYTHROSINE, C.I. No. 45430), Food Red 40 (ALLURA RED AC, C.I. No. 16035), Food Red 102 (NEW COCCINE, C.I. No. 16255), Food Red 104 (PHLOXINE, C.I. NO. 45410), Food Red 105 (ROSE BENGAL, C.I. No. 45440), Food Red 106 (ACID RED, C.I. No. 45100), Food Yellow 4 (Tartrazine, C.I. No. 19140), Food Yellow 5 (SUNSET YELLOW FCF, C.I. No. 15985), Food Green 3 (FAST GREEN FCF, C.I. No. 42053), Food Blue 1 (BRILLIANT BLUE FCF, C.I. No. 42090), and Food Blue 2 (INDIGO CARMINE, C.I. No. 73015).

The proportion of the amount of the coloring agents contained in the color toner of the present invention is normally 0.1 to 20 part by weight, or more preferably, 0.5 to 10 parts by weight, per 100 parts by weight of the color toner.

As described above, the color toner of the present invention contains 75 to 95 parts by weight of binder resin, 0.1 to 20 parts by weight or more preferably 0.5 to 10 parts by weight of coloring agents, and 0.1 to 10 parts by weight or more preferably 0.1 to 3 parts by weight of infrared absorbents, per 100 parts by weight of the color toner.

Further, a charge control agent can be added to the color toner of the present invention, so that charge amount fluctuations in charging operations and various environments can be reduced. This charge control agent is preferably colorless or pale-colored.

Known positive or negative charge control agent, such as a quaternary ammonium salt compound, a salicylic acid compound, a boric acid complex, or a carboxylic acid compound, can be used as the charge control agent.

The color toner of the present invention can be manufactured by a conventional method. First, binder resin, coloring agents, and an infrared absorbent having a light absorptivity in the 800 nm to 2000 nm wavelength range, more preferably, two or more infrared absorbents having different light absorptivity in the 800 nm to 2000 nm wavelength range, are prepared. A charge control agent and wax are added to the resultant, if necessary, to obtain the raw material. This raw material is then kneaded by a pressure kneader, a roll mill, or an extruder, and is uniformly dispersed. The dispersed raw material is ground and pulverized by a grinder or a jet mill, and is then classified by a pneumatic classifier to obtain a color toner having a desired particle size distribution.

As disclosed in Japanese Laid-Open Patent Application No. 7-191492, after the infrared absorbents and the charge control agent are each kneaded with a resin independently of each other, the infrared absorbents and the charge control agent may be kneaded together.

To increase the fluidity of the color toner of the present invention, inorganic particles (hereinafter referred to as "external additive") may cover the surfaces of the toner particles. The external additive used here is constituted by particles each having a particle size of 2 nm to 500 nm, or more preferably, 5 nm to 200 nm. The BET specific surface area of the external additive particles is preferably 20 $m^2/g$ to 500 $m^2/g$.

The proportion of the external additive to be added to the color toner of the present invention is 0.1 to 5 parts by weight, or more preferably, 0.1 to 2.0 parts by weight, per 100 parts by weight of the color toner. Examples of the external additive particles to be added to the color toner of the present invention include silica, alumina, titanium oxide, barium titanate, magnesium titanate, calcium titanate, strontium titanate, zinc oxide, quartz sand, clay, mica, wollastonite, diatomaceous earth, chromium oxide, cerium oxide, red iron oxide, antimony trioxide, magnesium oxide, zirconium oxide, barium sulfate, barium carbonate, calcium carbonate, silicon carbide, and silicon nitride. Among these examples, it is particularly preferable to use silica fine particles. The external additive particles are preferably hydrophobic.

EXAMPLES

In the following, the color toner and the image forming method of the present invention will be described in greater detail by way of examples.

Color toners in accordance with the present invention and toners for comparison were produced. In Examples 1-5 and Comparative Examples 1-4, specific examples of fixing single toner layers will be described. These examples include so-called twin-color image formation in which different toners are fixed at the same time as a single toner layer.

Example 1

| Blue Toner A | |
|---|---|
| Binder resin: polyester resin (NCP-001J, manufactured by Nippon Carbide Industries, Co. Inc.) | 91 parts by weight |
| Infrared absorbent (A): naphthalocyanine compound (YKR-5010, manufactured by Yamamoto Chemicals, Inc.) (the maximum absorptive wavelength: 880 nm) | 1 part by weight |
| Infrared absorbent (B): aminium salt compound (NIR-AM1, manufactured by Nagase ChemteX Corporation.) (the maximum absorptive wavelength: 1550 nm) | 1 part by weight |
| Coloring agent: copper phthalocyanine pigment (LIONOL BLUE ES, manufactured by Toyo Ink Mfg., Co.) | 5 parts by weight |
| Negative charge control agent: calix arene (BONTRON E-89, manufactured by Orient Chemicals Industries, Ltd.) | 2 parts by weight |

The above materials were put into a HENSCHEL MIXER, and were pre-mixed. The pre-mixed resultant was kneaded by an extruder, and was roughly ground by a hammer mill, followed by fine grinding by a jet mill. The resultant was classified by an air classifier to obtain a blue-color toner having a volume mean particle size of about 8.5 μm. As the external additive, 0.5 parts by weight of hydrophobic silica fine particles (H2000/4, manufactured by Clariant Corp.) were added to the blue-color toner, and an external addition process was carried out by the HENSCHEL MIXER so as to cover the surfaces of the blue-color toner particles with the external additive.

The PAS level was measured by integrating the infrared PAS spectrum of the blue toner A in the 800 nm to 2000 nm range. Carbon black was used as the reference material. With the PAS level of carbon black being a reference value of 1, the PAS level of the color toner was measured as a relative intensity. As a result, the relative intensity of the blue toner A was 0.07.

Other properties of the blue toner A obtained above were also measured. The results are shown in TABLE 1 (shown below) The measuring procedures will be described later in the specification.

Next, a toner image was formed with the blue toner A on a recording medium by a flash fixing printer that used a two-component developer, and the fixativity of the toner image was evaluated.

The two-component developer used in this example contained 4.5 parts by weight of the blue toner A and 95.5 parts by weight of Silicone Resin-Coated Magnetite Carrier (manufactured by Kanto Denka Kogyo, Co., Ltd.), which were mixed by a ball mill.

Figure 3:
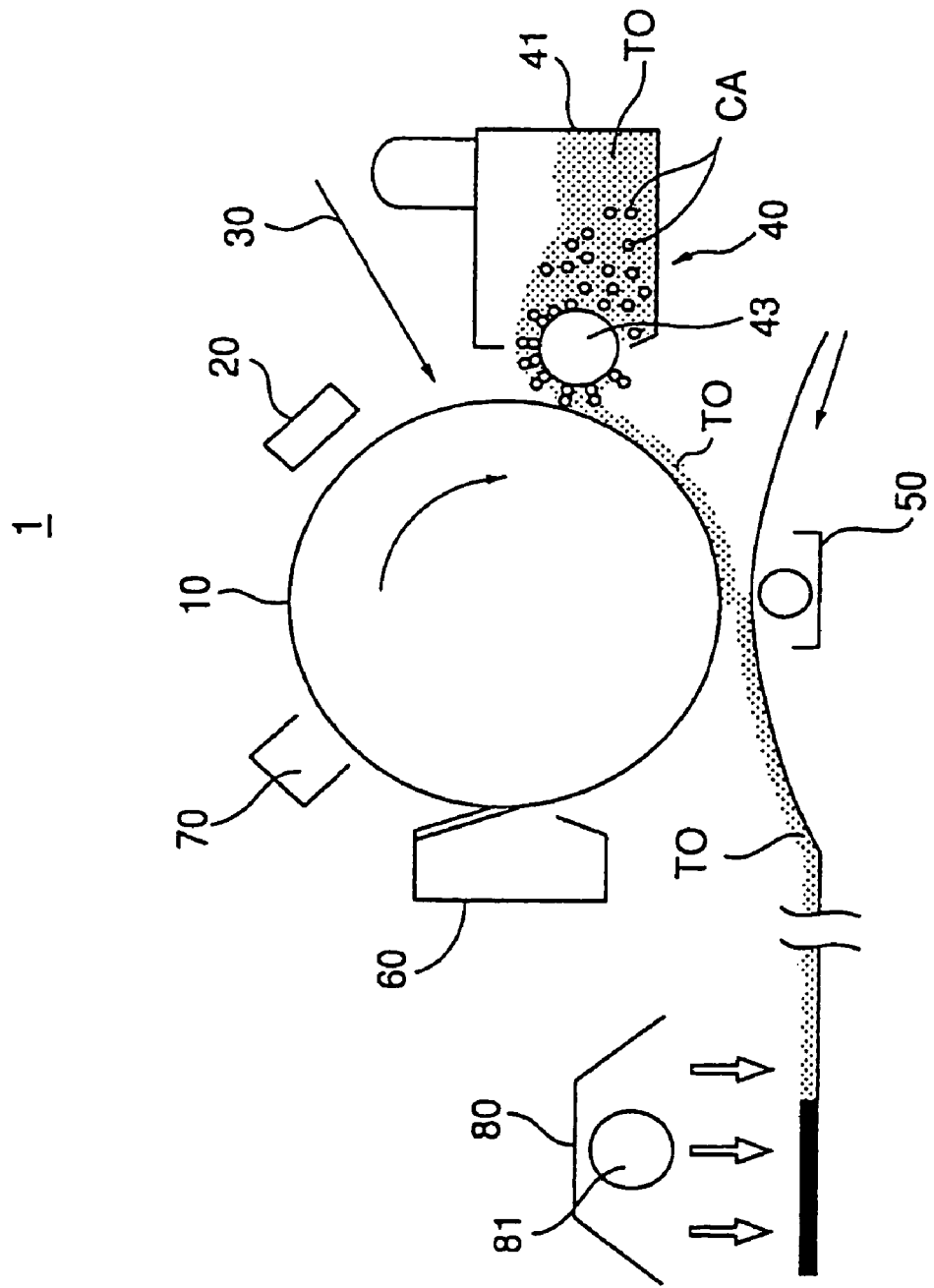
FIG. 3 is a schematic view of an image forming apparatus of a two-component developing system.

FIG. 3 is a schematic view of an image forming apparatus that employs a two-component developing technique in accordance with the present invention. This image forming apparatus 1 is of a high-speed developing type having a process speed of 600 mm/s, and includes an organic photosensitive member 10 that is placed in the center, a charger 20, an exposure unit 30, a developing unit 40, a transfer unit 50, a cleaner 60, a de-electrifier 70, and a flash fixing unit 80 having a xenon flash tube 81. The developer unit 40 includes a developer container 41, a developing roller 43, and a stirrer (not shown). In the developer container 41, toner particles TO are brought into contact with carrier particles CA, so that a predetermined quantity of electric charge is given to the toner.

In this example, a laser printer (PS2160, manufactured by Fujitsu Ltd.) that employs the xenon flash fixing technique was used as the image forming apparatus. The electric potential to be applied to the flash lamp was changed, so that the amount of light energy could be varied with unit areas on a recording medium (paper). In Example 1, light energy of 1.8 J/cm$^2$ with a light emission time of 1500 μs was supplied. With the light energy, the particle image formed with the blue toner A was melted and then solidified to obtain a fixed image. The fixativity and the image formation properties of the fixed image were evaluated. The evaluation method will be described later, and the evaluation results are shown in TABLE 1.

The blue toner A of Example 1 exhibited an excellent fixing rate of 90%, and did not cause voids due to excessive light energy.

Example 2

A blue toner B was produced in the same manner as in Example 1, except that the color toner materials were changed as shown below. The properties and characteristics of the blue toner B were measured in the same manner as in Example 1. The measurement results are shown in TABLE 1.

Evaluations of toner fixativity were also carried out in the same manner as in Example 1. The evaluation results showed that excellent fixativity with no voids was achieved with a high fixing rate of 80%. The PAS level of the blue toner B was 0.05, with the PAS level of carbon black being 1.

| Blue Toner B | |
|---|---|
| Binder resin: polyester resin (NCP-001J, manufactured by Nippon Carbide Industries, Co., Inc.) | 92 parts by weight |
| Infrared absorbent (A): naphthalocyanine compound (YKR-5010, manufactured by Yamamoto Chemicals, Inc.) | 0.5 part by weight |
| Infrared absorbent (B): diimonium salt compound (NIR-IM1, manufactured by Nagase ChemteX Corporation.) (the maximum absorptive wavelength: 1150 nm) | 1 part by weight |
| Coloring agent: copper phthalocyanine pigment (LIONOL BLUE ES, manufactured by Toyo Ink Mfg., Co.) | 5 parts by weight |
| Negative charge control agent: calix arene (BONTRON E-89, manufactured by Orient Chemicals Industries, Ltd.) | 2 parts by weight |

Example 3

A blue toner C was produced in the same manner as in Example 1, except that the color toner materials were changed as shown below. The properties and characteristics of the blue toner C were measured in the same manner as in Example 1. The measurement results are shown in TABLE 1. The PAS level of the blue toner C was 0.02, with the PAS level of carbon black being 1.

Evaluations of toner fixativity were also carried out in the same manner as in Example 1. The evaluation results showed that excellent fixativity with no voids was achieved with a high fixing rate of 70%.

| Blue Toner C | |
|---|---|
| Binder resin: polyester resin (NCP-001J, manufactured by Nippon Carbide Industries, Co., Inc.) | 90 parts by weight |
| Infrared absorbent (A): naphthalocyanine compound (YKR-5010, manufactured by Yamamoto Chemicals, Inc.) | 0.1 part by weight |
| Infrared absorbent (B): diimonium salt compound (NIR-IM1, manufactured by Nagase ChemteX Corporation.) | 1 part by weight |
| Coloring agent: copper phthalocyanine pigment (LIONOL BLUE ES, manufactured by Toyo Ink Mfg., Co.) | 5 parts by weight |
| Negative charge control agent: calix arene (BONTRON E-89, manufactured by Orient Chemicals Industries, Ltd.) | 2 parts by weight |

Comparative Example 1

A blue toner D was produced in the same manner as in Examples, except that the color toner materials were changed as shown below. The properties and characteristics of the blue toner D were measured in the same manner as in Examples. The PAS level of the blue toner was 0.005, with the PAS level of carbon black being 1. The evaluation results of the blue toner D are shown in TABLE 1.

Evaluations of toner fixativity were also carried out in the same manner as in Example 1. The results showed that the fixativity was insufficient with a low fixing rate of 50%, though no voids were caused.

The cause of the insufficient fixativity is that the PAS level of 0.005 of the toner D was much lower than the PAS level of any other toner of Examples, and the energy usage efficiency was poor though the same quantity of flashlight as in Examples was supplied.

| Blue Toner D | |
|---|---|
| Binder resin: polyester resin (NCP-001J, manufactured by Nippon Carbide Industries, Co., Inc.) | 92.95 parts by weight |
| Infrared absorbent: aminium salt compound (NIR-AM1, manufactured by Nagase ChemteX Corporation.) | 0.05 part by weight |
| Coloring agent: copper phthalocyanine pigment (LIONOL BLUE ES, manufactured by Toyo Ink Mfg., Co.) | 5 parts by weight |
| Negative charge control agent: calix arene (BONTRON E-89, manufactured by Orient Chemicals Industries, Ltd.) | 2 parts by weight |

Comparative Example 2

A blue toner E was produced in the same manner as in Example 1, except that the color toner materials were changed as shown below. The properties and characteristics of the blue toner E were also measured in the same manner as in Example 1. The PAS level of the blue toner E was 0.21, with the PAS level of carbon black being 1. The evaluation results are shown in TABLE 1.

Also, evaluations of toner fixativity were carried out in the same manner as in Example 1. The results showed that the fixativity was not desirable due to a large number of voids, though the fixing rate was as high as 90%. Furthermore, an image formed with the blue toner E was a dull blue, and a bright color tone could not be obtained.

In this comparative example, two different kinds of infrared absorbents were added to the blue toner E. However, an excessive addition of those infrared absorbents had adverse influence on the color tone of the toner, and also led to excessive meltdown of the toner.

| Blue Toner E | |
|---|---|
| Binder resin: polyester resin (NCP-001J, manufactured by Nippon Carbide Industries, Co., Inc.) | 73 parts by weight |
| Infrared absorbent (A): naphthalocyanine compound (YKR-5010, manufactured by Yamamoto Chemicals, Inc.) | 10 part by weight |
| Infrared absorbent (B): diimonium salt compound (NIR-IM1, manufactured by Nagase ChemteX Corporation.) | 10 part by weight |
| Coloring agent: copper phthalocyanine pigment (LIONOL BLUE ES, manufactured by Toyo Ink Mfg., Co.) | 5 parts by weight |
| Negative charge control agent: calix arene (BONTRON E-89, manufactured by Orient Chemicals Industries, Ltd.) | 2 parts by weight |

In Examples 4 and 5 and Comparative Examples 3 and A described below, actual fixativity in an image forming apparatus was examined, and simultaneous fixing of a plurality of toners, for example, a color toner and a black toner as a single toner layer, was carried out.

Example 4

A black toner F (black toner No. 1) was produced in the same manner as in Example 1, and the properties and characteristics of the toner F were measured. The evaluation results are shown in TABLE 1.

Using the blue toner A of Example 1 and the black toner F, twin-color image formation was carried out, and a fixing test was conducted by simultaneously fixing both toners on a recording medium. The PAS level of the blue toner A was 0.07, and the PAS level of the black toner F was 0.1. Accordingly, the PAS level ratio of the blue toner A to the black toner F is 0.7 (0.07/0.1).

In this example, the fixing rate of the blue toner A was 90%, and the fixing rate of the black toner F was 95%. Both the blue toner A and the black toner F caused no voids, and excellent fixativity was achieved.

| Black Toner F (Black Toner No. 1) | |
|---|---|
| Binder resin: polyester resin (NCP-001J, manufactured by Nippon Carbide Industries, Co., Inc.) | 88 parts by weight |
| Carbon: (Carbon #25, manufactured by Mitsubishi Chemical Corporation) | 10 parts by weight |
| Negative charge control agent: azo dye (BONTRON S-34, manufactured by Orient Chemicals Industries, Ltd.) | 2 parts by weight |

Example 5

Twin-color image formation and evaluations of toner fixativity were carried out in the same manner as in Example 4, except that the blue toner C of Example 3 was used as a color toner. The PAS level ratio of the blue toner C to the black toner F was 0.2.

In this example, the fixing rate of the blue toner C was 70%, and the fixing rate of the black toner F was 95%. Both the blue toner C and the black toner F caused no voids, and excellent fixativity was obtained accordingly.

Comparative Example 3

Twin-color image formation and evaluations of toner fixativity were carried out in the same manner as in Example 4, except that a black toner G (black toner No. 2; 0.13 in PAS level) was used as a black toner, the blue toner C was used as a color toner, and the irradiation light energy was 2.5 J/cm$^2$. The PAS level ratio of the blue toner C to the black toner G was approximately 0.15. Although the fixing rates of the blue toner C and the black toner G were 75% and 95%, respectively, desirable fixativity could not be obtained, because the black toner G caused voids.

| Black Toner G (Black Toner No. 2) | |
|---|---|
| Binder resin: polyester resin (NCP-001J, manufactured by Nippon Carbide Industries, Co., Inc.) | 83 parts by weight |
| Carbon: (Carbon #25, manufactured by Mitsubishi Chemicals, Inc.) | 15 parts by weight |
| Negative charge control agent: azo dye (BONTRON S-34, manufactured by Orient Chemicals Industries, Ltd.) | 2 parts by weight |

The black toner G used in this comparative example has a higher PAS level than the black toner F. For this reason, a preferable fixing light energy for the blue toner C might be too strong for the black toner G.

As also described before, the inventors confirmed that the PAS level ratio of a color toner to a black toner should preferably be in the range of 0.2 to 0.9 in a simultaneous twin-color toner image forming operation using the color toner and the black toner. The same results were obtained with other color toners such as a red toner, a green toner, a magenta toner, a cyan toner, and a yellow toner.

The inventors also examined the relationship between two different color toners in the same manner as in Examples 4 and 5 and Comparative Example 3. As a result, they confirmed that the PAS level ratio of each color toner to the other color toner that is simultaneously used should preferably be in the range of 0.2 to 5.

Comparative Example 4

The black toner F was used as a black toner, and a blue toner H was used as a color toner. The blue toner H was produced in the same manner as the blue toner A, except that the infrared absorbent (A) and the infrared absorbent (B) were both increased to 5 parts by weight, which was 10 parts by weight in total. The PAS level of the blue toner H was 0.095, and the PAS level ratio of the blue toner H to the black toner F was 0.95.

Evaluations of toner fixativity were carried out in the same manner as in Example 4. Although the fixing rates of the blue toner H and the black toner F were both 90%, a desirable image could not be obtained because the saturation of the fixed image of the blue toner H decreased.

| Blue Toner H | |
|---|---|
| Binder resin: polyester resin (NCP-001J, manufactured by Nippon Carbide Industries, Co., Inc.) | 83 parts by weight |
| Infrared absorbent (A): naphthalocyanine compound (YKR-5010, manufactured by Yamamoto Chemicals, Inc.) | 5 part by weight |
| Infrared absorbent (B): diimonium salt compound (NIR-IM1, manufactured by Nagase ChemteX Corporation.) | 5 part by weight |
| Coloring agent: copper phthalocyanine pigment (LIONOL BLUE ES, manufactured by Toyo Ink Mfg., Co.) | 5 parts by weight |
| Negative charge control agent: calix arene (BONTRON E-89, manufactured by Orient Chemicals Industries, Ltd.) | 2 parts by weight |

This comparative example proved that the fixativity could be improved by increases of the infrared absorbents, but the colored infrared absorbents had adverse influence on the saturation of a fixed image.

In Examples 6-7 and Comparative Examples 5-8 described below, mono-color or twin-color image formation was carried out by forming a single toner layer on a recording medium, and the relationship between the light energy (fixing energy) for flash fixing and the PAS level of each toner was examined. As for the recording medium, a thin layered film, a high quality 55-kg ream weight paper, and a high quality 120-kg ream weight paper were used. Evaluations of toner fixativity were also carried out for the cases where the recording medium was pre-heated to 60° C.

Example 6

Evaluations of the blue toner A were carried out in the same manner as in Example 1, except that the flashlight energy was 0.5 J/cm², and the light emission time was 3000 µs. In the case where the high quality 55-kg ream weight paper was used as the recording medium, sufficient fixativity could not be obtained with a fixing fate of 60%. However, in the case where the thin layered film was employed as the recording medium, and in the case where the high quality 55-kg ream weight paper pre-heated to 60° C. was used as the recording medium, excellent images having no voids were obtained with a fixing rate of 70%.

Example 7

Evaluations of the blue toner A were carried out in the same manner as in Example 1, except that the flashlight energy was 2.5 J/cm², and the light emission time was 500 µs. In this example, the fixing rate was 95%, and excellent fixativity with no voids was achieved.

Comparative Example 5

Evaluations of the blue toner A were carried out in the same manner as in Example 1, except that the flashlight energy was 0.4 J/cm², and the light emission time was 500 µs. In the case where the thin layered film, which is advantageous to fixativity with a small amount of energy, was used as the recording medium, the fixativity was insufficient with a fixing rate of 60%. In the case where the high quality 55-kg ream weight paper pre-heated to 60° C. was used as the recording medium, the fixativity was also insufficient with a fixing rate of 50%.

In this comparative example, even when a recording medium having a low heat absorption rate was employed, the light energy was too small to achieve desirable fixativity.

Comparative Example 6

Evaluations of the blue toner A were carried out in the same manner as in Example 1, except that the flashlight energy was 3.1 J/cm². In this comparative example, even when the high quality 120-kg ream weight paper having a high heat absorption rate was employed as the recording medium, voids were found in the fixed toner, and desirable fixativity could not be obtained. The cause of the defective fixativity can be considered to be the excessive light energy that led to excessive meltdown of the toner.

Comparative Example 7

Evaluations of the blue toner C were carried out in the same manner as in Example 1, except that the flashlight energy was 1 J/cm². In this comparative example, the fixativity was insufficient with a low fixing rate of 60%, though there were no voids. The cause of the insufficient fixativity can be considered to be the inadequate light energy.

Comparative Example 8

Evaluations of the blue toner A were carried out in the same manner as in Example 1, except that the flashlight energy was 3 J/cm². In this comparative example, even when the high quality 120-kg ream weight paper having a high heat absorption rate was employed as the recording medium, voids were found in the fixed toner, and desirable fixativity could not be obtained. The cause of the defective fixativity can be considered to be the excessive light energy that led to excessive meltdown of the toner.

As can be seen from Examples 6-7 and Comparative Examples 5-8 described above, desirable flash fixativity for mono-color or twin-color image formation can be achieved with a color toner of the present invention in the form of a single toner layer, even if the fixing energy is smaller than the fixing energy required for fixing of conventional color toners. More specifically, excellent fixativity can be achieved with a flashlight energy of 0.5 to 2.5 J/cm² and a light emission time of 500 to 3000 µs.

Furthermore, the inventors confirmed that excellent color toner fixativity for a single toner layer can be realized when the requirement expressed by the following relational expression (1) is satisfied:

$$0.03 \leq E \cdot S \leq 0.15 \quad (1)$$

wherein E represents the flashlight energy, S represents the PAS level, and E·S represents the product of the flashlight energy and the PAS level.

Figure 4:
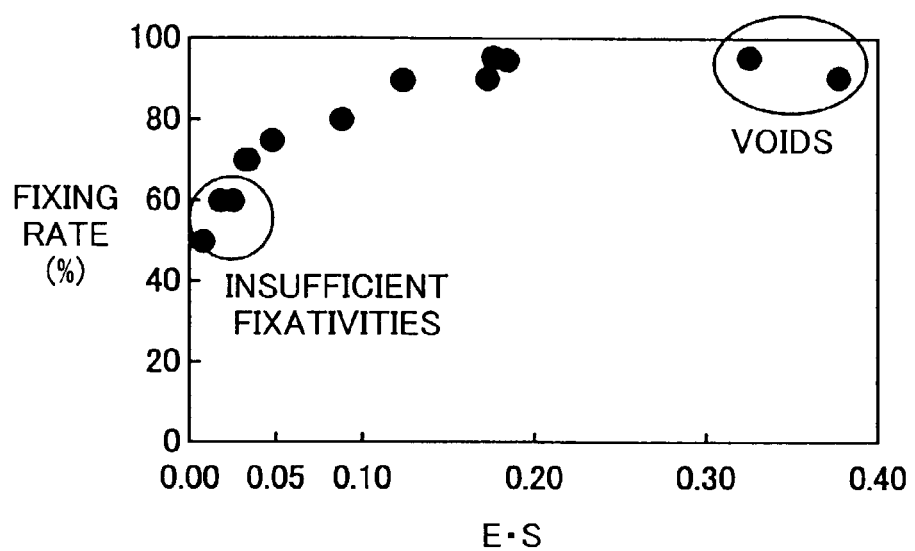
FIG. 4 shows the relationship between the ES value and the fixing rate of each color toner.

TABLE 1 shows the E·S value of each color toner described above in Examples and Comparative Examples. The relationship between the E·S value and the fixing rate of each color toner is shown in FIG. 4. As can be seen from FIG. 4, where the E·S value is too small, the fixativity is insufficient even if a recording medium suitable for maintaining fixativity is selected. Where the E·S value is too large, voids are found in the fixed toner image, even if a recording medium having a high heat absorption rate is selected to prevent excessive meltdown of the toner. It is therefore preferable to maintain the E·S value within the range expressed by the above relational expression (1). To allow the use of various types of recording media, it is even more preferable to maintain the E·S value within the range expressed by the above relational expression (1).

layers with flash fixing light energy and the characteristics of the toners were examined in multi-color or full-color image forming operations.

TABLE 1

| | Evaluations | Toner | Viscosity | PAS | Color Tone | Fixing Rate | Light Energy | Medium | E.S | ρ/S | ρ/S · E |
|---|---|---|---|---|---|---|---|---|---|---|---|
| Example 1 | Blue Single Layer | blue A | 189.7 | 0.07 | ○ | 90 | 1.8 | paper | 0.126 | 2710 | 1505.6 |
| Example 2 | Blue Single Layer | blue B | 183 | 0.05 | ○ | 80 | 1.8 | paper | 0.09 | 3660 | 2033.3 |
| Example 3 | Blue Single Layer | blue C | 194.8 | 0.02 | ○ | 70 | 1.8 | paper | 0.036 | 9740 | 5411.1 |
| Comparative Example 1 | Blue Single Layer | blue D | 174.2 | 0.005 | X | 50 | 1.8 | paper | 0.009 | 34840 | 19355.6 |
| Comparative Example 2 | Blue Single Layer | blue E | 172.7 | 0.021 | X | 90 | 1.8 | paper | 0.038 | 8223.8 | 4568.8 |
| Example 4 | Blue/Black Layer | black F | 183.2 | 0.1 | ○ | 95 | 1.8 | paper | 0.18 | 1832 | 1017.8 |
| | | blue A | 189.7 | 0.07 | | 90 | 1.8 | paper | 0.126 | 2710 | 1505.6 |
| Example 5 | Blue/Black Layer | black F | 183.2 | 0.1 | ○ | 90 | 1.8 | paper | 0.18 | 1832 | 1017.8 |
| | | blue C | 194.8 | 0.02 | | 70 | 1.8 | paper | 0.036 | 9740 | 3896.0 |
| Comparative Example 3 | Blue/Black Layer | black G | 178.1 | 0.13 | X | 95 | 2.5 | paper | 0.325 | 1370 | 548.0 |
| | | blue C | 194.8 | 0.02 | black voids | 75 | 2.5 | paper | 0.05 | 9740 | 3896.0 |
| Comparative Example 4 | Blue/Black Layer | black F | 183.2 | 0.1 | blue color tone | 90 | 1.8 | paper | 0.18 | 1832 | 1017.8 |
| | | blue H | 172.2 | 0.095 | X | 90 | 1.8 | paper | 0.171 | 1812.6 | 1007.0 |
| Example 6 | Blue Single Layer | blue A | 189.7 | 0.07 | ○ | 60° C. 70 | 0.5 | paper | 0.035 | 2710 | 5420.0 |
| | | | 189.7 | 0.07 | ○ | 70 | 0.5 | film | 0.035 | 2710 | 5420.0 |
| Example 7 | Blue Single Layer | blue A | 189.7 | 0.07 | ○ | 95 | 2.5 | paper | 0.175 | 2710 | 1084.0 |
| Comparative Example 5 | Blue Single Layer | blue A | 189.7 | 0.07 | X | 60° C. 50 | 0.4 | paper | 0.028 | 2710 | 6775.0 |
| | | | 189.7 | 0.07 | X | 60 | 0.4 | film | 0.058 | 2710 | 6775.0 |
| Comparative Example 6 | Blue Single Layer | blue A | 189.7 | 0.07 | blue voids | X | 3.1 | paper | 0.217 | 2710 | 874.2 |
| Comparative Example 7 | Blue Single Layer | blue C | 194.8 | 0.02 | | 60 | 1 | film | 0.02 | 9740 | 9740.0 |
| Comparative Example 8 | Blue Single Layer | blue A | 189.7 | 0.07 | blue voids | X | 3 | paper | 0.21 | 2710 | 903.3 |

As can be seen from Table 1, the color toners of Examples 1-7 satisfy the requirement expressed by the above relational expression (1), but the color toners of Comparative Examples 1-8 do not satisfy the same requirement.

In the cases where a black toner and a blue toner are simultaneously fixed as in Examples 4 and 5 and Comparative Example 3, it is necessary to maintain both toners in good condition. However, the toner of Comparative Example 3 has voids caused in the black toner. Accordingly, the color tone of Comparative Example 3 is considered to be "unacceptable (X)".

Figure 5:
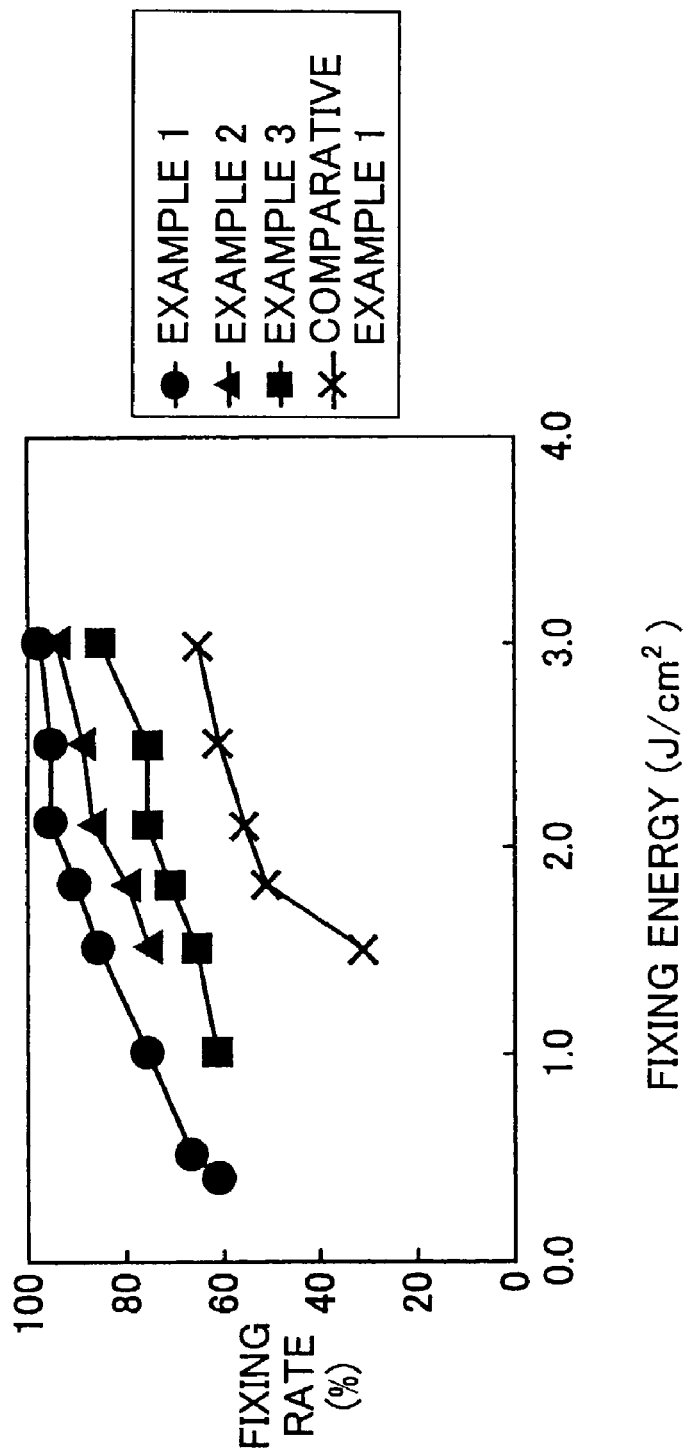
FIG. 5 shows the relationship between the fixing energy (J/cm$^2$) and the fixing rate (%) of each color toner.

FIG. 5 shows the relationship between the fixing energy (flashlight energy) and the fixing rate (%) of each color toner of Examples 1-3 and Comparative Example 1, with the light emission time being 1500 μs.

As can be seen from FIG. 5, each color toner of Examples 1-3 can obtain a high fixing rate with a fixing energy smaller than 1.75 J/cm$^2$, with which the fixativity of the toner of Comparative Example 1 becomes defective. This confirms that a color toner of the present invention can reduce the fixing energy required for flash fixing.

In the above described examples, toner fixing was carried out for blue and/or black color toners in accordance with the present invention. However, the color toner of the present invention is not limited to blue and black toners. The present invention can also provide toners of other colors, such as red, green, magenta, cyan, and yellow, to achieve excellent toner fixativity with a smaller light energy.

More examples and comparative examples will be described below. In these examples and comparative examples, relationships between toners in multi-color or full-color image forming operations were examined, where a plurality of toner layers are stacked on a recording medium. More particularly, relationships of stacked toner layers with flash fixing light energy and the characteristics of the toners were examined in multi-color or full-color image forming operations.

After a single toner layer was formed on a recording medium, flash fixing was carried out. These procedures were repeated to obtain a plurality of toner layers stacked on the recording medium. The evaluation results of cases where the sequential-development and sequential-fixing technique was employed in image formation will described below as Examples 8-10 and Comparative Examples 9-15.

In these examples, a sequential-development and sequential-fixing process was carried out four times to achieve 4-cycle image formation, and evaluations of the image quality (picture quality) were carried out.

In the sequential-development and sequential-fixing processes, the toner used in the first cycle was exposed to the flashlight in the second, third, and fourth cycles, as well as the flashlight in the first cycle.

The toner used in the second cycle was not only required to be fixable as a toner layer onto the surface of the recording medium, but also required to be fixable as a toner layer onto the already fixed toner layer.

Furthermore, it was necessary to observe the fixing behaviors of a plurality (up to 4 in the case of 4-cycle image formation) of toner layers stacked on the recording medium, as well as the simultaneous fixing (melting) behaviors of a plurality of toners (one being a particle image, the other one being a fixed image) in an image forming operation such as the above described twin-color image formation.

Taking the above factors into consideration, evaluations, especially fixativity evaluations, were carried out for cases of image formation of the toner of each cycle, image formation of the combination of two or three toner layers, and image formation of all the four stacked toner layers.

The printer used in the image forming operations was a laser printer (modified PS2160, manufactured by Fujitsu Ltd.) that employs a xenon flash fixing system. After one cycle of development and fixing was carried out by the printer, the development and fixing process was repeated to achieve 4-cycle sequential-development and sequential-fixing image formation.

The following are examples of the sequential-development and sequential-fixing image formation. The stacking order of toner layers is shown in the beginning of description of each example, with R representing red, G representing green, B representing blue, Y representing yellow, M representing magenta, C representing cyan, and K representing black.

Example 8

R→G→B→K

Image forming operations through sequential development and sequential fixing were performed using a three-color toner group consisting of a red toner I, a green toner J, and a blue toner K, together with a black toner L. Evaluations of the image formation were carried out.

The toners were produced in the same manner as in Example 1, using the materials described below. The properties and characteristics of the toners used in the image forming operations are shown in TABLE 2.

The sequential-development and sequential-fixing image forming order was red, green, blue, and black. The light energies in the fixing procedures of these toners were 2.6 J/cm$^2$, 2.6 J/cm$^2$, 2.6 J/cm$^2$, and 1.9 J/cm$^2$, respectively.

The results of the image formation showed that all the fixing rates in the image forming operations fell in the range of 80% to 90%, and that the toner fixativity was excellent. The image quality was also excellent, with no image defects such as voids being found.

| Red Toner I | |
|---|---|
| Binder resin: polyester resin (FN-1, manufactured by Kao Corporation) | 92 parts by weight |
| Infrared absorbent (A): naphthalocyanine compound (YKR-5010, manufactured by Yamamoto Chemicals, Inc.) | 0.4 part by weight |
| Infrared absorbent (B): phosphorylated ytterbium (Type UU-HP, manufactured by Shin-Etsu Chemicals, Co., Ltd.) | 1 part by weight |
| Coloring agent: arylamide (IRGALITE 3RS, manufactured by Ciba Speciality Chemicals Corporation) | 5 parts by weight |
| Negative charge control agent: calix arene (BONTRON E-89, manufactured by Orient Chemicals Industries, Ltd.) | 1 part by weight |

| Green Toner J | |
|---|---|
| Binder resin: polyester resin (FN-1, manufactured by Kao Corporation) | 92 parts by weight |
| Infrared absorbent (A): naphthalocyanine compound (YKR-5010, manufactured by Yamamoto Chemicals, Inc.) | 0.4 part by weight |
| Infrared absorbent (B): phosphorylated ytterbium (Type UU-HP, manufactured by Shin-Etsu Chemicals, Co., Ltd.) | 1 part by weight |
| Coloring agent: bromo copper phthalocyanine (HOSTAPERM GNX-L, manufactured by Clariant Corp.) | 5 parts by weight |
| Negative charge control agent: calix arene (BONTRON E-89, manufactured by Orient Chemicals Industries, Ltd.) | 1 part by weight |

| Blue Toner K | |
|---|---|
| Binder resin: polyester resin (FN-1, manufactured by Kao Corporation) | 92 parts by weight |
| Infrared absorbent (A): naphthalocyanine compound (YKR-5010, manufactured by Yamamoto Chemicals, Inc.) | 0.4 part by weight |
| Infrared absorbent (B): phosphorylated ytterbium (Type UU-HP, manufactured by Shin-Etsu Chemicals, Co., Ltd.) | 1 part by weight |
| Coloring agent: copper phthalocyanine pigment (LIONOL BLUE ES, manufactured by Toyo Ink Mfg., Co., Ltd.) | 5 parts by weight |
| Negative charge control agent: calix arene (BONTRON E-89, manufactured by Orient Chemicals Industries, Ltd.) | 1 part by weight |

| Black Toner L | |
|---|---|
| Binder resin: polyester resin (FN-1, manufactured by Kao Corporation) | 91 parts by weight |
| Coloring agent: carbon (MA-100S, manufactured by Mitsubishi Chemical Corporation) | 7 parts by weight |
| Negative charge control agent: calix arene (BONTRON E-89, manufactured by Orient Chemicals Industries, Ltd.) | 2 part by weight |

Example 9

Y→M→C→K

Image forming operations through sequential development and sequential fixing were performed using a three-color toner group consisting of a yellow toner M, a magenta toner N, and a cyan toner O, together with the black toner L. Evaluations of the image formation were carried out in the same manner as in Example 8.

The toners used in this example were produced in the same manner as in Example 1, using the material shown below. The properties and characteristics of the toners used in the image formation in this example are shown in TABLE 2.

The sequential-development and sequential-fixing image forming order was yellow, magenta, cyan, and black. The light energies in the fixing procedures of these toners were 2.6 J/cm$^2$, 2.6 J/cm$^2$, 2.6 J/cm$^2$, and 1.9 J/cm$^2$, respectively.

The results of the image formation showed that the fixing rates of all the image forming operations fell in the range of 80% to 90%, and that the toner fixativity was excellent. The image quality was also excellent, with no image defects such as voids being found.

| Yellow Toner M | |
|---|---|
| Binder resin: polyester resin (FN-1, manufactured by Kao Corporation) | 92 parts by weight |
| Infrared absorbent (A): naphthalocyanine compound (YKR-5010, manufactured by Yamamoto Chemicals, Inc.) | 0.4 part by weight |
| Infrared absorbent (B): samarium oxide (Type UU-HP, manufactured by Shin-Etsu Chemicals, Co., Ltd.) | 1 part by weight |
| Coloring agent: benzimidazolone (NOVOPERM YELLOW P-HG, manufactured by Clariant Corp.) | 5 parts by weight |
| Negative charge control agent: calix arene (BONTRON E-89, manufactured by Orient Chemicals Industries, Ltd.) | 1 part by weight |

-continued

| Magenta Toner N | |
|---|---|
| Binder resin: polyester resin (FN-1, manufactured by Kao Corporation) | 92 parts by weight |
| Infrared absorbent (A): naphthalocyanine compound (YKR-5010, manufactured by Yamamoto Chemicals, Inc.) | 0.4 part by weight |
| Infrared absorbent (B): phosphorylated ytterbium (Type UU-HP, manufactured by Shin-Etsu Chemicals, Co., Ltd.) | 1 part by weight |
| Coloring agent: quinacridone (HOSTAPERM PINK E02, manufactured by Clariant Corp.) | 5 parts by weight |
| Negative charge control agent: calix arene (BONTRON E-89, manufactured by Orient Chemicals Industries, Ltd.) | 1 part by weight |

| Cyan Toner O | |
|---|---|
| Binder resin: polyester resin (FN-1, manufactured by Kao Corporation) | 92 parts by weight |
| Infrared absorbent (A): naphthalocyanine compound (YKR-5010, manufactured by Yamamoto Chemicals, Inc.) | 0.4 part by weight |
| Infrared absorbent (B): phosphorylated ytterbium (Type UU-HP, manufactured by Shin-Etsu Chemicals, Co., Ltd.) | 1 part by weight |
| Coloring agent: copper phthalocyanine (HOSTAPERM BLUE B2G, manufactured by Clariant Corp.) | 5 parts by weight |
| Negative charge control agent: calix arene (BONTRON E-89, manufactured by Orient Chemicals Industries, Ltd.) | 1 part by weight |

Comparative Example 9

K→R→G→B

Image forming operations through sequential development and sequential fixing were performed using a three-color toner group consisting of the red toner I, the green toner J, and the blue toner K, together with the black toner L. Evaluations of the image formation were carried out in the same manner as in Example 8.

The sequential-development and sequential-fixing image forming order was changed to black, red, green, and blue, starting from the black toner L that came last in Example 8. Accordingly, the light energies in the fixing procedures of these toners were changed to 1.9 J/cm$^2$, 2.6 J/cm$^2$, 2.6 J/cm$^2$, and 2.6 J/cm$^2$, respectively.

The results of the image formation showed that the fixing rates of all the image forming operations fell in the range of 80% to 90%, and that the toner fixativity was excellent. However, voids were found in the image parts of the black toner, and the image quality was not satisfactory as a whole.

The cause of the unsatisfactory image quality is that the light energy required for fixing the color toners I, J, and K was too strong for the black toner L, and caused excessive meltdown of the black toner.

Comparative Example 10

K→R→G→B

Image forming operations were performed in the same manner as in Comparative Example 9, except that the light energies in the fixing procedures for the toners were all 1.9 J/cm$^2$. Evaluations of the image formation were then carried out.

Although no voids were found in the image parts of the black toner, the fixativity of the red toner I, especially the fixativity between the red toner I and the toners that were in contact with the red toner I was weak, with a fixing rate of 50% or lower. As a result, the image quality was not satisfactory as a whole.

The cause of this unsatisfactory image quality can be considered that the light energy suitable for the black toner L is not enough for fixing the contact areas of the stacked color toner layers.

Comparative Example 11

K→R→G→B

Image forming operations through sequential development and sequential fixing were performed in the same manner as in Example 8, using the three-color toner group consisting of the red toner I, the green toner J, and the blue toner K, together with a black toner P. Evaluations of the image formation were then carried out. The toners of this comparative example were produced in the same manner as in Example 1, using the materials shown below. The properties and characteristics of the toners used in the image formation of this comparative example are shown in TABLE 2.

The sequential-development and sequential-fixing image forming order was black, red, green, and blue, which is the same as in Comparative Example 10. The black toner P of this comparative example was produced with a smaller amount of carbon as a coloring agent, so as to lower the PAS level. Accordingly, the light energies of the four cycles were all set at 2.6 J/cm$^2$.

The evaluation results showed that the fixing rates of all the image forming operations fell in the range of 80% to 90%, and the toner fixativity was excellent. The black toner image parts had less voids than in Comparative Example 10, and the image quality was on the border of acceptable level. However, the blackness of the black toner P was insufficient, because of the reduced amount of carbon. With the insufficient blackness and voids of the black toner image parts, the image quality was not satisfactory as a whole. Furthermore, the total amount of light energy required for the toner fixing was larger than the total light energy used in Example 8, which makes this comparative example even more undesirable.

| Black Toner P | |
|---|---|
| Binder resin: polyester resin (FN-1, manufactured by Kao Corporation) | 96 parts by weight |
| Coloring agent: carbon (MA-100S, manufactured by Mitsubishi Chemical Corporation) | 2 parts by weight |
| Negative charge control agent: calix arene (BONTRON E-89, manufactured by Orient Chemicals Industries, Ltd.) | 2 part by weight |

Example 10

K→R→G→B

Image forming operations through sequential development and sequential fixing were performed in the same manner as in Example 8, using the three-color toner group consisting of the red toner I, the green toner J, and the blue toner K, together with a black toner Q. Evaluations of the image formation were then carried out. The toners of this example were produced in the same manner as in Example 1, using the materials shown below. The properties and characteristics of the toners used in the image formation of this example are shown in TABLE 2.

The sequential-development and sequential-fixing image forming order was black, red, green, and blue, which is the same as in Comparative Example 9. The black toner Q used in this example was produced to increase the void resistance, using binder resins of high melt viscosity. Accordingly, the light energies of the four cycles were all set at 2.6 J/cm². As a result, the fixing rates of the color toners fell into the range of 80% to 90%, and the fixing rate of the black toner Q was 70%. Although the fixing rate of the black toner Q was rather low, no voids were found, and the image quality as a whole was satisfactory.

In this example, the total amount of light energy required for the toner fixing was larger than the total light energy used in Example 8. However, this example prolonged the life of the developer, using binder resins of high melt viscosity. Having such an advantage, this example should be acceptable.

| Black Toner Q | |
|---|---|
| Binder resin: polyester resin (FIZ-100, manufactured by Harima Chemicals, Inc.) | 64 parts by weight |
| Binder resin: polyester resin (NE2150, manufactured by Kao Corporation) | 27 parts by weight |
| Coloring agent: carbon (MA-100S, manufactured by Mitsubishi Chemical Corporation) | 7 parts by weight |
| Negative charge control agent: calix arene (BONTRON E-89, manufactured by Orient Chemicals Industries, Ltd.) | 2 part by weight |

Comparative Example 12

K→R→G→B

Image forming operations through sequential development and sequential fixing were performed in the same manner as in Example 8, using the three-color toner group consisting of the red toner I, the green toner J, and the blue toner K, together with a black toner R. Evaluations of the image formation were then carried out. The toners of this comparative example were produced in the same manner as in Example 1, using the materials shown below. The properties and characteristics of the toners used in the image formation of this comparative example are shown in TABLE 2.

The sequential-development and sequential-fixing image forming order was black, red, green, and blue, which is the same as in Comparative Example 11. The black toner R used in this comparative example contained binder resins of higher melt viscosity than the binder resins of Example 10. The light energies of the four cycles were all set at 2.6 J/cm², which is the same as in Example 10.

As a result of the image formation, the fixing rates of the color toners fell into the range of 80% to 90%. However, the fixing rate of the black toner Q was 60%, which was below the acceptable level. Accordingly, the image formation of this comparative example was unacceptable.

| Black Toner R | |
|---|---|
| Binder resin: polyester resin (FIZ-100, manufactured by Harima Chemicals, Inc.) | 9 parts by weight |
| Binder resin: polyester resin (TAFTON NE2150, manufactured by Kao Corporation) | 82 parts by weight |
| Coloring agent: carbon (MA-100S, manufactured by Mitsubishi Chemical Corporation) | 7 parts by weight |
| Negative charge control agent: calix arene (BONTRON E-89, manufactured by Orient Chemicals Industries, Ltd.) | 2 part by weight |

Comparative Example 13

Y→M→C→K

Image forming operations through sequential development and sequential fixing were performed in the same manner as in Example 9, using a three-color toner group consisting of the yellow toner M, a magenta toner T, and the cyan toner O, together with the black toner L. Evaluations of the image formation were then carried out. The toners used in this comparative example were produced in the same manner as in Example 1, using the material shown below. The properties and characteristics of the toners used in the image formation in this comparative example are shown in TABLE 2. The sequential-development and sequential-fixing image forming order was yellow, magenta, cyan, and black. The light energies in the fixing procedures of these toners were 2.6 J/cm², 2.6 J/cm², 2.6 J/cm², and 1.9 J/cm², respectively.

The magenta toner T used in this comparative example had a higher PAS level than the magenta toner N of Example 9, and contained a binder resin of low melt viscosity.

As a result of the image formation, the fixing rates of all the image forming operations fell in the range of 80% to 90%, and the toner fixativity was excellent. However, voids were found in the image part of the magenta toner T, and the image quality as a whole was unsatisfactory.

| Magenta Toner T | |
|---|---|
| Binder resin: polyester resin (FN-1, manufactured by Kao Corporation) | 92 parts by weight |
| Infrared absorbent (A): naphthalocyanine compound (YKR-5010, manufactured by Yamamoto Chemicals, Inc.) | 0.5 part by weight |
| Infrared absorbent (B): ytterbium oxide (Type UU-HP, manufactured by Shin-Etsu Chemicals, Co., Ltd.) | 1 part by weight |
| Coloring agent: quinacridone (HOSTAPERM PINK E02, manufactured by Clariant Corp.) | 5 parts by weight |
| Negative charge control agent: calix arene (BONTRON E-89, manufactured by Orient Chemicals Industries, Ltd.) | 1 part by weight |

Comparative Example 14

Y→M→C→K

Image forming operations through sequential development and sequential fixing were performed in the same manner as in Comparative Example 13, using the three-color toner group consisting of the yellow toner M, the magenta toner T, and the cyan toner O, together with the black toner L. Evaluations of the image formation were then carried out. The sequential-development and sequential-fixing image forming order was yellow, magenta, cyan, and black. Since the image parts of the magenta toner that was developed and fixed in the second cycle had voids in Comparative Example 13, the light energy in the magenta fixing procedure was reduced. The light energies in the fixing procedures of the four toners were set at 2.6 J/cm$^2$, 1.9 J/cm$^2$, 1.9 J/cm$^2$, and 1.9 J/cm$^2$, respectively.

As a result of the image formation, the fixing rate of the cyan toner O was as low as 50%, and the image quality as a whole was unsatisfactory.

Comparative Example 15

Y→M→C→K

Image forming operations through sequential development and sequential fixing were performed in the same manner as in Comparative Example 13, using the three-color toner group consisting of the yellow toner M, the magenta toner T, and the cyan toner O, together with the black toner L. Evaluations of the image formation were then carried out. The sequential-development and sequential-fixing image forming order was yellow, magenta, cyan, and black. Since the image parts of the magenta toner that was developed and fixed in the second cycle had voids in Comparative Example 13, the light energy in the magenta fixing procedure was reduced. Accordingly, the light energies in the fixing procedures of the four toners were set at 2.6 J/cm$^2$, 1.9 J/cm$^2$, 2.6 J/cm$^2$, and 1.9 J/cm$^2$, respectively.

As a result of the image formation, the fixing rates of all the image forming operations fell into the range of 80% to 90%, and the toner fixativity was excellent. However, voids were found in the magenta toner image parts as in Comparative Example 13, and the image quality as a whole was unsatisfactory.

This comparative example teaches that voids might be caused when a fixed toner image part having no voids melts again in later cycles by a light energy that is too strong for the toner.

TABLE 2

| Evaluations | | Toner | Viscosity | PAS | Color Tone | Fixing Rate | Light Energy | ES | ρ/S | ρ/S · E |
|---|---|---|---|---|---|---|---|---|---|---|
| Example 8 | Sequential Fixing RGBK | red I | 412 | 0.04 | ○ | ○ | 2.6 | 0.104 | 10300 | 3961.5 |
| | | green J | 503 | 0.05 | ○ | ○ | 2.6 | 0.13 | 10060 | 3869.2 |
| | | blue K | 472 | 0.06 | ○ | ○ | 2.6 | 0.156 | 7866.7 | 3025.6 |
| | | black L | 356 | 0.12 | ○ | ○ | 1.9 | 0.228 | 2966.7 | 1561.4 |
| Example 9 | Sequential Fixing TMCK | yellow M | 408 | 0.035 | ○ | ○ | 2.6 | 0.091 | 11657 | 4483.5 |
| | | magenta N | 442 | 0.04 | ○ | ○ | 2.6 | 0.104 | 11050 | 4250.0 |
| | | cyan O | 474 | 0.06 | ○ | ○ | 2.6 | 0.156 | 7900 | 3038.5 |
| | | black L | 356 | 0.12 | ○ | ○ | 1.9 | 0.228 | 2966.7 | 1561.4 |
| Comparative Example 9 | Sequential Fixing KRGB | black L | 356 | 0.12 | | ○ | 1.9 | 0.228 | 2966.7 | 1561.4 |
| | | (black L) | 356 | 0.12 | black voids | X | 2.6 | 0.312 | 2966.7 | 1141.0 |
| | | red I | 412 | 0.04 | | ○ | 2.6 | 0.104 | 10300 | 3961.5 |
| | | green J | 503 | 0.05 | | ○ | 2.6 | 0.13 | 10060 | 3869.2 |
| | | blue K | 472 | 0.06 | | ○ | 2.6 | 0.156 | 7866.7 | 3025.6 |
| Comparative Example 10 | Sequential Fixing KRGB | black L | 356 | 0.12 | | ○ | 1.9 | 0.228 | 2966.7 | 1561.4 |
| | | red I | 412 | 0.04 | | X | 1.9 | 0.076 | 10300 | 5421.1 |
| | | green J | 503 | 0.05 | | X 60 | 1.9 | 0.095 | 10060 | 5294.7 |
| | | blue K | 472 | 0.06 | | X | 1.9 | 0.114 | 7866.7 | 4140.4 |
| Comparative Example 11 | Sequential Fixing KRGB | black P | 434 | 0.085 | insufficient blackness | ○ | 2.6 | 0.221 | 5105.9 | 1963.8 |
| | | red I | 412 | 0.04 | | ○ | 2.6 | 0.104 | 10300 | 3961.5 |
| | | green J | 503 | 0.05 | | ○ | 2.6 | 0.13 | 10060 | 3869.2 |
| | | blue K | 472 | 0.06 | | ○ | 2.6 | 0.156 | 7866.7 | 3025.6 |
| Example 10 | Sequential Fixing KRGB | black Q | 962 | 0.11 | ○ | ○ | 2.6 | 0.286 | 8745.5 | 3363.6 |
| | | red I | 412 | 0.04 | ○ | ○ | 2.6 | 0.104 | 10300 | 3961.5 |
| | | green J | 503 | 0.05 | ○ | ○ | 2.6 | 0.13 | 10060 | 3869.2 |
| | | blue K | 472 | 0.06 | ○ | ○ | 2.6 | 0.156 | 7866.7 | 3025.6 |
| Comparative Example 12 | Sequential Fixing KRGB | black R | 2660 | 0.12 | | X | 2.6 | 0.312 | 22167 | 8525.6 |
| | | red I | 412 | 0.04 | | ○ | 2.6 | 0.104 | 10300 | 3961.5 |
| | | green J | 503 | 0.05 | | ○ | 2.6 | 0.13 | 10060 | 3869.2 |
| | | blue K | 472 | 0.06 | | ○ | 2.6 | 0.156 | 7866.7 | 3025.6 |
| Comparative Example 13 | Sequential Fixing YMCK | yellow M | 408 | 0.035 | | ○ | 2.6 | 0.091 | 11657 | 4483.5 |
| | | magenta T | 116.6 | 0.05 | voids | ○ | 2.6 | 0.13 | 2332 | 896.9 |
| | | cyan O | 474 | 0.05 | | ○ | 2.6 | 0.13 | 9480 | 3646.2 |
| | | black L | 356 | 0.12 | | ○ | 1.9 | 0.228 | 2966.7 | 1561.4 |
| Comparative Example 14 | Sequential Fixing YMCK | yellow M | 408 | 0.035 | | ○ | 2.6 | 0.091 | 11657 | 4483.5 |
| | | magenta T | 116.6 | 0.04 | | ○ | 1.9 | 0.076 | 2915 | 1534.2 |
| | | cyan O | 474 | 0.05 | | X 50 | 1.9 | 0.095 | 9480 | 4989.5 |
| | | black L | 356 | 0.12 | | ○ | 1.9 | 0.228 | 2966.7 | 1561.4 |

TABLE 2-continued

| | Evaluations | Toner | Viscosity | PAS | Color Tone | Fixing Rate | Light Energy | ES | ρ/S | ρ/S · E |
|---|---|---|---|---|---|---|---|---|---|---|
| Comparative Example 15 | Sequential Fixing YMCK | yellow M | 408 | 0.035 | | ○ | 2.6 | 0.091 | 11657 | 4483.5 |
| | | magenta T | 116.6 | 0.04 | | ○ | 1.8 | 0.072 | 2915 | 1619.4 |
| | | (magenta T) | 116.6 | 0.04 | voids | X | 2.6 | 0.104 | 2915 | 1121.2 |
| | | cyan O | 474 | 0.06 | | ○ | 2.6 | 0.156 | 7900 | 3038.5 |
| | | black L | 356 | 0.12 | | ○ | 1.8 | 0.216 | 2966.7 | 1648.1 |

TABLE 2, showing the results of a series of image formation through sequential development and sequential fixing, confirms the following facts.

1) From the above evaluation results, the ρ/E·S value that can prevent defective toner fixativity and excessive fixativity (i.e., voids) should be in the range of 1150 to 4950. Therefore, the relational expression (3) should be satisfied to achieve excellent light emission fixativity in an image forming apparatus that performs image forming operations through sequential development and sequential fixing.

2) The lower limit of the ρ/E·S value in the multi-layer toner image formation is slightly higher than the lower limit in the single-layer toner fixing process. This is because light emission is carried out twice or more in a sequential-development and sequential-fixing image forming operation, though light emission is carried out only once for a single toner layer in a mono-color image forming operation. For this reason, excessive meltdown of toners might be easily caused in a sequential-development and sequential-fixing image forming operation, and thus the lower limit of the ρ/E·S value is higher.

From the experiences of the inventors, the range of the ρ/E·S value should be constant, even where a sequential-development and sequential-fixing procedures are repeated four times or more. This is because the influence of the repetitive light emission on the melt characteristics of the toners is supposed to become largest at an early stage such as the second or third cycle of the repetitive procedures.

3) The upper limit of the ρ/E·S value in the multi-layer toner fixing process is slightly lower than the upper limit in a single toner layer. This is because the heat loss caused by the heat escaping from the bottom surface of a toner layer (a particle image) to the recording medium is greater in the multi-layer toner image formation than in the single-layer toner image formation. The heat converted from light is absorbed not only by the recording medium but also by other toners that have already melted in the multi-layer toner image formation, while the heat loss is caused only by the heat escaping from a toner layer to the recording medium. Thus, the heat loss is greater in the multi-layer toner image formation.

In the following, examples in which the sequential-development and batch-fixing technique is employed for image formation will be described. The sequential-development and batch-fixing technique is generally employed in tandem full-color printers. In a sequential-development and batch-fixing process, a developing operation is normally repeated four times, and a toner particle image consisting of a maximum of four layers is formed on a recording medium. The four layers are then fixed at once.

With the toners used in the examples being α, β, γ, and δ, there are four cases of toner layer formation on a recording medium. The first case of the four cases is a case where each of the toners α, β, γ, and δ is in a single-layer state. The second case is a case where the toners α, β, γ, and δ are in a two-layer state of α+β, α+γ, α+δ, β+γ, β+ε and γ+δ. The third case is a case where the toners α, β, γ, and δ are in a three-layer state of α+β+γ, α+β+δ, α+γ+δ, and β+γ+δ. The fourth case is a case where the toners α, β, γ, and δ are in a four-layer state of α+β+γ+δ. In this example, it is necessary to achieve satisfactory fixativity for all of the above cases.

However, if full-color development is carried out with the four colors of α+β+γ+δ, the developed color is substantially black in color tone, because the resultant color of the equivalent-weight mixture of yellow, magenta, and cyan is black. For this reason, the maximum developing amounts of the four colors of α+β+γ+δ are not developed at the same time.

Furthermore, the developing amount of each color varies from zero to the maximum in the developing process, because a gradual color representing manner is employed. Also, in a flash-fixing image forming apparatus of sequential-development and batch-fixing, the developing order is a very important factor. When light energy is provided for stacked toner layers, a large amount of the light energy is absorbed by the upper toner layers, and only a small amount of the light energy reaches the lower layers. This often adversely affects the toner fixativity and image formation.

In this example, a tandem full-color printer (F6908B, manufactured by Fujitsu Ltd.) was used, with its fixing unit being removed. Toner particle images (stacked layers) of all the above described cases of image formation were outputted onto a recording medium. The toner particle images were then fixed by a laser printer (PS2160, manufactured by Fujitsu Ltd.) that employs the flash fixing technique. After the fixing, evaluations of toner fixativity and image formation were carried out.

To facilitate the measurement of the effects of this example, the experiment was divided into the following four stages.

(First Stage)

The amount of light energy required for fixing stacked toner layers was measured.

The total amount of toners in the stack of the maximum number of toner layers was assumed to be 2.0 mg/cm$^2$. The blue toner C and a black toner S were selected as a typical combination of toners having different characteristics. Theses toners were developed four time to form a toner layer of 2.0 mg/cm$^2$ on the recording medium. Flashlight was then emitted onto the toner layer, with the amount of emission energy being changed. After the fixing, evaluations of toner fixativity were carried out, and the evaluation results are shown in TABLE 3-1.

To determine whether the toner fixativity was acceptable, the fixativity of the stacked toner layers as a whole was examined.

(Second Stage)

Where the emission of strong light energy that had been determined from the examination in the first stage was carried out, the relationship between toner conditions (the PAS level and melt viscosity) for preventing voids in single-layer toner layers was determined. Here, a black toner and a blue toner each having the PAS level and melt viscosity adjusted in the later described manner were used. The evaluation results are shown in TABLES 3-1 and 3-2.

(Third Stage)

Taking the toner condition range determined in the second stage into consideration, toners of yellow, magenta, and cyan, were produced, and the examination results of the second stage were confirmed. Further, the differences of the image formation characteristics that originated from the toner stacking order were observed. The results are shown in TABLE 4.

(Fourth Stage)

The factors, other than the PAS level and melt viscosity, that had influence on the image formation characteristics were observed.

Each toner used in the above stages contained a binder resin consisting of two polyester resins (FN-1 manufactured by Kao Corporation and FIZ-100 manufactured by Harima Chemicals, Inc.). The proportion of the two polyester resins was varied to adjust the melt viscosity. Also, the particle sizes (or the specific surface area) and the amounts of the infrared absorbents to be added to the toners were varied to adjust the PAS levels. Furthermore, the degrees of dispersion of the pigments used for the toners were varied to adjust the covering powers.

The adjustment of the dispersion degrees of pigments was carried out by varying the proportion of a masterbatched pigment and a non-masterbatched pigment.

The properties and characteristics of the evaluated toners are shown in TABLE 4.

| Black Toner S | |
|---|---|
| Binder resin: polyester resin (FIZ-100, manufactured by Harima Chemicals, Inc.) | 46 parts by weight |
| Binder resin: polyester resin (TAFTON NE2150, manufactured by Kao Corporation) | 45 parts by weight |
| Coloring agent: carbon (MA-100S, manufactured by Mitsubishi Chemical Corporation) | 7 parts by weight |
| Negative charge control agent: calix arene (BONTRON E-89, manufactured by Orient Chemicals Industries, Ltd.) | 2 parts by weight |

TABLE 3-1

| Evaluations | Toner | Viscosity | PAS | Color Tone | Fixing Rate | Light Energy | ES | ρ/S | ρ/S · E |
|---|---|---|---|---|---|---|---|---|---|
| Batch Fixing | blue C | 1984 | 0.02 | | X | 1.8 | 0.036 | 9740 | 5411.1 |
| First Stage | blue C | 1948 | 0.02 | | ○ 70 | 2.5 | 0.05 | 9740 | 3896.0 |
| | blue C | 1948 | 0.02 | | ○ 80 | 3 | 0.06 | 9740 | 3246.7 |
| | blue C | 1948 | 0.02 | | ○ 85 | 4 | 0.08 | 9740 | 2435.0 |
| | black S | 1220 | 0.1 | | X | 1.8 | 0.18 | 12200 | 6777.8 |
| | black S | 1220 | 0.1 | | X 50 | 2.5 | 0.25 | 12200 | 4880.0 |
| | black S | 1220 | 0.1 | | X 60 | 3 | 0.3 | 12200 | 4066.7 |
| | black S | 1220 | 0.1 | | ○ 80 | 4 | 0.4 | 12200 | 3050.0 |
| Batch Fixing | black F | 1832 | 0.1 | voids | | 3 | 0.3 | 1832 | 610.7 |
| Second Stage Black | black G | 178.1 | 0.13 | voids | | 3 | 0.39 | 1370 | 456.7 |
| | black L | 356 | 0.12 | voids | | 3 | 0.36 | 2966.7 | 988.9 |
| | black P | 434 | 0.085 | | | 3 | 0.255 | 5105.9 | 1702.0 |
| | black Q | 962 | 0.11 | | | 3 | 0.33 | 8745.5 | 2915.2 |
| | black R | 2660 | 0.12 | | | 3 | 0.36 | 22167 | 7388.9 |
| | black F | 1832 | 0.1 | voids | | 3.5 | 0.35 | 1832 | 523.4 |
| | black G | 1781 | 0.13 | voids | | 3.5 | 0.455 | 1370 | 391.4 |
| | black L | 356 | 0.12 | voids | | 3.5 | 0.42 | 2966.7 | 847.6 |
| | black P | 434 | 0.085 | | | 3.5 | 0.298 | 5105.9 | 1458.8 |
| | black Q | 962 | 0.11 | | | 3.5 | 0.385 | 8745.5 | 2498.7 |
| | black R | 2660 | 0.12 | | | 3.5 | 0.42 | 22167 | 6333.3 |
| | black F | 1832 | 0.1 | voids | | 4 | 0.4 | 1832 | 458.0 |
| | black G | 1781 | 0.13 | voids | | 4 | 0.52 | 1370 | 342.5 |
| | black L | 356 | 0.12 | voids | | 4 | 0.48 | 2966.7 | 741.7 |
| | black P | 434 | 0.085 | | | 4 | 0.34 | 5105.9 | 1276.5 |
| | black Q | 962 | 0.11 | | | 4 | 0.44 | 8745.5 | 2186.4 |
| | blaok R | 2660 | 0.12 | | | 4 | 0.48 | 221.67 | 5541.7 |

TABLE 3-2

| Evaluations | Toner | Viscosity | PAS | Color Tone | Light Energy | E.S | ρ/S | ρ/S · E |
|---|---|---|---|---|---|---|---|---|
| Batch Fixing Second Stage blue | blue A | 189.7 | 0.07 | voids | 3 | 0.21 | 271.0 | 903.3 |
| | blue B | 183 | 0.05 | | 3 | 0.15 | 3660 | 1220.0 |
| | blue C | 194.8 | 0.02 | | 3 | 0.06 | 9740 | 3246.7 |
| | blue D | 174.2 | 0.005 | | 3 | 0.015 | 34840 | 11613.3 |

TABLE 3-2-continued

| Evaluations | Toner | Viscosity | PAS | Color Tone | Light Energy | E.S | ρ/S | ρ/S · E |
|---|---|---|---|---|---|---|---|---|
| | blue E | 172.7 | 0.021 | | 3 | 0.063 | 8223.8 | 2741.3 |
| | blue H | 172.2 | 0.095 | voids | 3 | 0.285 | 1812.6 | 604.2 |
| | blue K | 472 | 0.05 | | 3 | 0.18 | 7866.7 | 2622.2 |
| | cyan U | 760 | 0.045 | | 3 | 0.135 | 16889 | 5629.6 |
| | cyan O | 474 | 0.06 | | 3 | 0.18 | 7900 | 2633.3 |
| | blue A | 189.7 | 0.07 | voids | 3.5 | 0.245 | 2710 | 774.3 |
| | blue B | 183 | 0.05 | | 3.5 | 0.175 | 3660 | 1045.7 |
| | blue C | 194.8 | 0.02 | | 3.5 | 0.07 | 9740 | 2782.9 |
| | blue D | 174.2 | 0.005 | | 3.5 | 0.018 | 34840 | 9954.3 |
| | blue E | 172.7 | 0.021 | | 3.5 | 0.074 | 8223.8 | 2349.7 |
| | blue H | 172.2 | 0.095 | voids | 3.5 | 0.333 | 1812.6 | 517.9 |
| | blue K | 472 | 0.06 | | 3.5 | 0.21 | 7866.7 | 2247.6 |
| | cyan U | 760 | 0.045 | | 3.5 | 0.158 | 16889 | 4825.4 |
| | cyan O | 474 | 0.06 | | 3.5 | 0.21 | 7900 | 2257.1 |
| | blue A | 189.7 | 0.07 | voids | 4 | 0.28 | 2710 | 677.5 |
| | blue B | 183 | 0.05 | voids | 4 | 0.2 | 3660 | 915.0 |
| | blue C | 194.8 | 0.02 | | 4 | 0.08 | 9740 | 2435.0 |
| | blue D | 174.2 | 0.005 | | 4 | 0.02 | 34840 | 8710.0 |
| | blue E | 172.7 | 0.021 | | 4 | 0.084 | 8223.8 | 2056.0 |
| | blue H | 172.2 | 0.095 | voids | 4 | 0.38 | 1812.6 | 453.2 |
| | blue K | 472 | 0.06 | | 4 | 0.24 | 7866.7 | 1966.7 |
| | cyan U | 760 | 0.045 | | 4 | 0.18 | 16889 | 4222.2 |
| | cyan O | 474 | 0.06 | | 4 | 0.24 | 7900 | 1975.0 |

(First Stage) Experiment Result

As can be seen from TABLE 3, it is necessary to provide a light energy of 2.5 J/cm$^2$ or more to melt the blue toner C having a relatively low viscosity. Meanwhile, it is necessary to provide a light energy of 4.0 J/cm$^2$ or more to melt the black toner S having a relatively high viscosity.

However, it was found that a light energy of 7.0 J/cm$^2$ or more yellowed the recording medium. For this reason, the light energy used for batch fixing should be in the range of 2.5 J/cm$^2$ to 7.0 J/cm$^2$, more preferably, in the range of 3.5 J/cm$^2$ to 5.0 J/cm$^2$.

As can also be seen from TABLE 3, the ρ/E·S value of a toner that exhibited excellent fixativity was 4000 or smaller.

(Second Stage) Experiment Results

Nine single layers of blue and cyan toners A, B, C, D, E, H, K, O, and U, as well as six single layer of black toners F, G, L, P, Q, and R, were subjected to light energy emission, with the amount of light energy being varied in the range of 3.0 J/cm$^2$ to 4.0 j/cm$^2$. The results of the black toners are shown in TABLE 3-1, and the results of the blue toners are shown in TABLE 3-2.

As can be seen from TABLES 3-1 and 3-2, voids were found in the five toners of A, F, G, H, L, and P, where the light energy was 3.0 J/cm$^2$ or 3.5 J/cm$^2$. With the light energy of 4.0 J/cm$^2$, voids were found in the toner B, as well as the above five toner.

The ρ/E·S values of those six toners are all smaller than 1000, as shown in TABLES 3-1 and 3-2.

The above results confirm that, if the ρ/E·S value is 1000 or larger, excellent fixativity with no voids can also be obtained in the sequential-development and batch-fixing process.

The composition of the cyan toner U is as follows.

| Cyan Toner U | |
|---|---|
| Binder resin: polyester resin (FIZ-100, manufactured by Harima Chemicals, Inc.) | 92 parts by weight |
| Infrared absorbent (A): naphthalocyanine compound (YKR-5010, manufactured by Yamamoto Chemicals, Inc.) | 0.35 part by weight |
| Infrared absorbent (B): ytterbium oxide (Type UU-HP, manufactured by Shin-Etsu Chemicals, Co., Ltd.) | 1 part by weight |
| Coloring agent: copper phthalocyanine (HOSTAPERM BLUE B2G, manufactured by Clariant Corp.) | 4.5 parts by weight |
| Negative charge control agent: calix arene (BONTRON E-89, manufactured by Orient Chemicals Industries, Ltd.) | 1 part by weight |

(Third Stage) Experiment Results

To determine whether the ρ/E·S value range of 1000 to 4000 obtained from the first and second stages was also valid in the 4-color image formation of yellow, magenta, cyan, and black, image forming operations were performed under the four conditions described below, and evaluations of fixativity and image formation quality were carried out. The evaluation results are shown in TABLE 4.

TABLE 4

| Evaluations | Toner | Viscosity | PAS | Color Tone | Fixing Rate | Light Energy | E.S | ρ/S | ρ/S · E |
|---|---|---|---|---|---|---|---|---|---|
| Example 11 | black Q | 962 | 0.11 | ○ | ○ | 3.5 | 0.385 | 8745.5 | 2498.7 |
| YMCK | cyan D | 474 | 0.045 | ○ | ○ | 3.5 | 0.158 | 10533 | 3009.5 |

TABLE 4-continued

| Evaluations | Toner | Viscosity | PAS | Color Tone | Fixing Rate | Light Energy | E·S | ρ/S | ρ/S · E |
|---|---|---|---|---|---|---|---|---|---|
| Batch | magenta N | 442 | 0.04 | ○ | ○ | 3.5 | 0.14 | 11050 | 3157.1 |
| Fixing | yellow M | 408 | 0.035 | ○ | ○ | 3.5 | 0.123 | 11657 | 3330.6 |
| Third Stage | | | | | | | | | |
| Example 12 | black Q | 962 | 0.11 | ○ | ○ | 4 | 0.44 | 8745.5 | 2186.4 |
| | magenta N | 442 | 0.04 | ○ | ○ | 4 | 0.16 | 11050 | 2762.5 |
| | yellow M | 408 | 0.035 | ○ | ○ | 4 | 0.14 | 11657 | 2914.3 |
| | cyan U | 760 | 0.045 | ○ | ○ | 4 | 0.18 | 16889 | 4222.2 |
| Comparative | black Q | 962 | 0.11 | | X | 3.5 | 0.385 | 8745.5 | 2498.7 |
| 18 | cyan D | 474 | 0.045 | | X | 3.5 | 0.158 | 10533 | 3009.5 |
| Batch | magenta V | 785 | 0.04 | | ○ | 3.5 | 0.14 | 19625 | 5607.1 |
| Fixing | yellow M | 408 | 0.035 | | X | 3.5 | 0.123 | 11657 | 3330.6 |
| Third Stage | | | | | | | | | |
| Comparative | black Q | 962 | 0.11 | | | 3.5 | 0.385 | 8745.5 | 2498.7 |
| 17 | cyan D | 474 | 0.045 | | | 3.5 | 0.158 | 10533 | 3009.5 |
| | magenta T | 1166 | 0.04 | voids | | 3.5 | 0.14 | 2915 | 832.9 |
| | yellow M | 408 | 0.035 | | | 3.5 | 0.123 | 11667 | 3330.6 |
| Example 13 | black Q | 962 | 0.11 | ○ | ○ | 3.5 | 0.385 | 8745.5 | 2498.7 |
| Batch | yellow W | 412 | 0.035 | ○ | ○ | 3.5 | 0.123 | 11771 | 3363.3 |
| Fixing | magenta N | 442 | 0.04 | ○ | ○ | 3.5 | 0.14 | 11050 | 3157.1 |
| Fourth Stage | cyan D | 474 | 0.045 | ○ | ○ | 3.5 | 0.158 | 10533 | 3009.5 |
| Covering | | | | | | | | | |
| Power | | | | | | | | | |
| Comparative | black Q | 962 | 0.11 | | ○ | 3.5 | 0.385 | 8745.5 | 2498.7 |
| 18 | magenta N | 442 | 0.04 | | ○ | 3.5 | 0.14 | 11050 | 3157.1 |
| Covering | yellow W | 412 | 0.035 | | ○ | 3.5 | 0.123 | 11771 | 3363.3 |
| Power | cyan D | 474 | 0.045 | | ○ | 3.5 | 0.158 | 10533 | 3009.5 |
| Comparative | black Q | 962 | 0.11 | | ○ | 3.5 | 0.385 | 8745.5 | 2498.7 |
| 19 | magenta N | 442 | 0.04 | | ○ | 3.5 | 0.14 | 11050 | 3157.1 |
| Covering | cyan D | 474 | 0.045 | | ○ | 3.5 | 0.158 | 10533 | 3009.5 |
| Power | yellow W | 412 | 0.035 | | ○ | 3.5 | 0.123 | 11771 | 3363.3 |

Example 11

K→C→M→Y

Image forming operations through sequential development and batch fixing were performed using the three-color toner group consisting of the yellow toner M, the magenta toner N, and the cyan toner O, together with the black toner Q. Evaluations of the image formation were then carried out. The toner layer stacking order on the recording medium was black, cyan, magenta, and yellow. The light energy was 3.5 J/cm². As can be seen from TABLE 4, the fixing rates of all the image forming operations fell in the range of 80% to 90%. No voids were found in the fixed toner images, including the image of the single-layer toners, and excellent image quality was achieved. The ρ/E·S values of the toners used in this example ranged from 2499 to 3331, which was within the above described range.

Example 12

K→M→Y→C

Image forming operations through sequential development and batch fixing were performed using the three-color toner group consisting of a yellow toner M, a magenta toner N, and the cyan toner U, together with the black toner Q. Evaluations of the image formation were then carried out.

The toner layer stacking order on the recording medium was black, magenta, yellow, and cyan. The light energy was 4.0 J/cm². As can be seen from TABLE 4, the fixing rates of all the image forming operations fell in the range of 80% to 90%. No voids were found in the fixed toner images, including the image of the single-layer toners, and excellent image quality was achieved. The ρ/E·S values of the toners used in this example ranged from 2186 to 4222, which was within the above described range.

Comparative Example 16

K→C→M→Y

Image forming operations through sequential development and batch fixing were performed using a three-color toner group consisting of the yellow toner M, the cyan toner O, and a magenta toner V, together with the black toner Q. Evaluations of the image formation were then carried out. The toners used for the image formation were produced in the same manner as in Example 1, using the materials shown below. The properties and characteristics of the toners used for the image formation of this comparative example are shown in TABLE 4. The toner layer stacking order on the recording medium was black, cyan, magenta, and yellow. The light energy was 3.5 J/cm². As a result of the image formation, the fixing rates of the single-layer part of the magenta toner V, the other single-layer parts, and the stacked parts of the other toners, were 70% or higher. However, the fixing rates of the stacked parts of the magenta toner and the other toners were 50% or lower. Because of this, the image formation quality was unsatisfactory.

The ρ/E·S values of the toners used in this comparative example ranged from 2499 to 3331, which was within the above described range, though the ρ/E·S value of the magenta toner V was 5607, which was outside the above described range.

| Magenta Toner V | |
| --- | --- |
| Binder resin: polyester resin (FIZ-100, manufactured by Harima Chemicals, Inc.) | 74 parts by weight |
| Binder resin: polyester resin (TAFTON NE2150, manufactured by Kao Corporation) | 18 parts by weight |
| Infrared absorbent (A): naphthalocyanine compound | 0.4 part by weight |
| Infrared absorbent (B): ytterbium oxide (Type UU-HP, manufactured by Shin-Etsu Chemicals, Co., Ltd.) | 1 part by weight |
| Coloring agent: quinacridone (HOSTAPERM PINK E02, manufactured by Clariant Corp.) | 5 parts by weight |
| Negative charge control agent: calix arene (BONTRON E-89, manufactured by Orient Chemicals Industries, Ltd.) | 1 part by weight |

Comparative Example 17

K→C→M→Y

Image forming operations through sequential development and batch fixing were performed using the three-color toner group consisting of the yellow toner M, the cyan toner O, and the magenta toner T, together with the black toner Q. Evaluations of the image formation were then carried out. The toner layer stacking order on the recording medium was black, cyan, magenta, and yellow. The light energy was 3.5 J/cm². As can be seen from TABLE 4, many voids were found in the magenta single-layer toner part and the part of the magenta toner layer stacked on the cyan toner layer. Because of this, the image formation quality was unsatisfactory.

The ρ/E·S values of the toners used in this comparative example ranged from 2499 to 3331, which was within the above described range, though the ρ/E·S value of the magenta toner T was 833, which was outside the above described range.

As can be seen from Examples 11-12 and Comparative Examples 16-17, if there is a color toner that does not satisfy the relational expression (4) among the toners used for image formation, the image formed parts of the color toner become defective. On the other hand, if all the toners used for the image formation satisfy the relational expression (4), excellent fixativity can be surely obtained, and image defects can be prevented, regardless of the developing order of the toners.

(Fourth Stage) Experiment Results

Next, the toner characteristics such as the covering power and the toner developing order were examined to achieve higher image quality.

In full-color image formation, toners having a high transparency or a low covering power are required to achieve image formation of a wide color reproduction range. However, full-color toners used for flash fixing contains infrared absorbents, as described above, and the infrared absorbents have adverse influence on the color tones of the toners, even though they are hypochromic. To reduce the influence from the infrared absorbents, a toner coloring agent having a high covering power can be effectively employed in a full-color image forming operation.

To achieve the antinomic objectives, the inventors conducted the following experiments. In these experiments, a toner having a high covering power is a yellow toner.

Example 13

K→Y→M→C

Image forming operations through sequential development and batch fixing were performed using a three-color toner group consisting of the magenta toner N, the cyan toner O, and a yellow toner W, together with the black toner Q. Evaluations of the image formation were then carried out. The yellow toner W differs from the yellow toner M, containing a pigment of large particle size. The specific difference between the two yellow toners lies in that the covering power of the yellow toner M is 14, while the covering power of the yellow toner W is 21.

The properties and characteristics of the toners used for the image formation of this example are shown in TABLE 4. The toner layer stacking order on the recording medium was black, yellow, magenta, and cyan. The light energy was 3.5 J/cm². As a result of the image formation, the fixing rates of all the image forming operations fell in the range of 80% to 90%, and voids were not found in any formed image, including the single-layer toner part of each color. The color reproduction range of the image formation was 119%, with the color reproduction range of the image formation of Example 11 using the yellow toner M being 100%. Especially, large increases of the color reproduction range were found in the red, yellow, and green color image regions that were affected by the yellow toner W.

| Yellow Toner W | |
| --- | --- |
| Binder resin: polyester resin (FN-1, manufactured by Kao Corporation) | 92 parts by weight |
| Infrared absorbent (A): naphthalocyanine compound (YKR-5010, manufactured by Yamamoto Chemicals, Inc.) | 0.4 part by weight |
| Infrared absorbent (B): samarium oxide (Type UU-HP, manufactured by Shin-Etsu Chemicals, Co., Ltd.) | 1 part by weight |
| Coloring agent: naphthol (PERMANENT RUBINE F6, manufactured by Clariant Corp.) | 5 parts by weight |
| Negative charge control agent: calix arene (BONTRON E-89, manufactured by Orient Chemicals Industries, Ltd.) | 1 part by weight |
| Covering Power: | 21 |

Comparative Example 18

K→M→Y→C

Image forming operations through sequential development and batch fixing were performed in the same manner as in Example 13, except that the toner layer stacking order on the recording medium was black, magenta, yellow, and cyan. Evaluations of the image formation were carried out, and the evaluation results are shown in TABLE 4. In the image formation of this comparative example, problems such as insufficient fixativity and voids were not found. The color reproduction range, which was defined in Example 13, decreased to 88%. More specifically, the color tone of the red region formed by the mixture of yellow and magenta showed a tendency to shift to yellow, which supposedly resulted in the decrease of the color reproduction range.

Comparative Example 19

K→M→Y→C

Image forming operations through sequential development and batch fixing were performed in the same manner as in Example 13, except that the toner layer stacking order on the recording medium was black, magenta, yellow, and cyan. Evaluations of the image formation were then carried out. In the image formation of this comparative example, problems such as insufficient fixativity and voids were not found. However, the entire image was slightly yellowed, and the color reproduction range, which was defined in Example 13, decreased to 78%.

More specifically, the color tones of the red, yellow, and green regions that were affected by the yellow toner showed a tendency to shift to yellow in hue, which resulted in the large decrease of the color reproduction range.

Next, the influence of the relationship between the ρ/E·S value and the developing order on the image formation characteristics was examined. Image forming operations using the toners used in Example 11 were performed, with the developing order being varied, and the differences in image quality were observed in great detail.

As shown in TABLE 5, the cyan toner O had a covering power of 18, and a ρ/E·S value of 3009.5. The magenta toner N had a covering power of 16, and a ρ/E·S value of 3157.1. The yellow toner M had a covering power of 14, and a ρ/E·S value of 3330.6.

TABLE 5

| Developing Order | Toner Name | Covering Power | ρ/E · S | Color Reproduction Range |
|---|---|---|---|---|
| Cyan | Toner O | 18 | 3009.5 | 100 |
| Magenta | Toner N | 16 | 3157.1 | |
| Yellow | Toner M | 14 | 3330.6 | |
| Cyan | Toner O | 18 | 3009.5 | 96 |
| Yellow | Toner M | 14 | 3330.6 | |
| Magenta | Toner N | 16 | 3157.1 | |
| Magenta | Toner N | 16 | 3157.1 | 95 |
| Cyan | Toner O | 18 | 3009.5 | |
| Yellow | Toner M | 14 | 3330.6 | |
| Magenta | Toner N | 16 | 3157.1 | 88 |
| Yellow | Toner M | 14 | 3330.6 | |
| Cyan | Toner O | 18 | 3009.5 | |
| Yellow | Toner M | 14 | 3330.6 | 92 |
| Cyan | Toner O | 18 | 3009.5 | |
| Magenta | Toner N | 16 | 3157.1 | |
| Yellow | Toner M | 14 | 3330.6 | 85 |
| Magenta | Toner N | 16 | 3157.1 | |
| Cyan | Toner O | 18 | 3009.5 | |

Since a black toner was not necessary to observe color reproduction ranges, the image forming operations were performed using the three color toners. The evaluation results of the image formation are shown in TABLE 5. The color reproduction ranges are shown as ratios to the color reproduction range (100%) obtained in Example 11, which exhibited the widest color reproduction range.

As can be seen from TABLE 5, to obtain a wide color reproduction range, a toner layer stacking order should be determined in such a manner that the toner layer having the smallest ρ/E·S value and the highest covering power is placed directly on the recording medium, and the toner layer having the largest ρ/E·S value and the lowest covering power being placed at the top of the toner layer stack, with the ρ/E·S values and the covering powers of the toners being varied gradually.

The inventors also evaluated the results of combinations of other toners having different covering powers and ρ/E·S values, and confirmed that a wide color reproduction range was obtained in a case where the toner layer stacking order was arranged in such a manner that a toner layer closer to the recording medium had a relatively small ρ/E·S value while a toner layer farther from the recording medium had a relatively large ρ/E·S value, with a toner layer closer to the recording medium having a relatively high covering power, and the differences in the covering powers of the toner layers being not very large.

The inventors presumed the factors that caused the above results as follows.

First, the fact that the ρ/E·S value of the toner layer closer to the recording medium (the lower toner layer) is small implies that this toner layer has a higher meltability than the other toner layers. Since a large amount of light energy emitted from above is absorbed by the upper toner layer, the lower toner layer remains in a relatively high-viscosity state compared with the upper toner layer. However, the difference in the melting state between the upper toner layer and the lower toner layer is smaller in the case of this toner layer stacking order, than in the case where the toner layer stacking order is reversed. The small difference in the melting state facilitates the mixture of melted toners, and the color reproduction range can be widened.

On the other hand, if a toner layer having a high covering power is placed at the top of the toner layer stack, the incident light is reflected by the top toner layer, which makes it difficult for the color tones of the lower layers to appear on the surface. Being affected by the color tone of the top layer, the color reproduction range is narrow in this case.

From the above facts, the following conditions should be considered to be desirable for sequential-development and batch-fixing image formation.

1) Sufficient fixativity and excellent image formation can be obtained by providing color toners, where the relationship among the melt viscosity p of each toner at a reference temperature (125° C., for example), the PAS level S of the toner, and the light energy E supplied in the fixing procedure, is expressed by the relational expression (5).

2) A wide color reproduction range can be secured by arranging the toner layer stacking order in such a manner that the toner layer having the smallest ρ/E·S value and the highest covering power is placed directly on the recording medium, and the toner layer having the largest ρ/E·S value and the lowest covering power is placed at the top of the toner layer stack, with the ρ/E·S values and the covering powers of the toners being varied gradually.

In the above described sequential-development and sequential-fixing image formation, the covering power of an upper toner layer should be set at a low level, so that a lower toner image layer can easily melt again in the stage of light energy emission. By doing so, the toners of the upper and lower toner layers are relatively uniformly mixed, and the color reproduction range can be widened.

As disclosed in Japanese Laid-Open Patent Application Nos. 2001-102603 and 2001-392759, the inventors of the present invention also discovered that the PAS level of a toner can be controlled by adjusting the particle size (or the specific surface area) of the infrared absorbent contained in the toner, where the infrared absorbent is insoluble in the binder resin contained in the same toner.

Although specific examples are not shown in this specification, the technique of controlling the particle size (or the specific surface area) of the infrared absorbent is very effective as a control technique to satisfy the relational expressions (1) -(5) in adjusting the PAS levels while minimizing the adverse influence on the characteristics of the toners, such as the melt characteristics, the electric resistance, and charge characteristics.

Where at least one infrared absorbent contained in each toner is a solid material that is insoluble in the binder resin contained in the same toner, and the specific surface area of the infrared absorbents contained in the toner used in the nth developing step satisfies the relational expression (6), the characteristics of each toner, such as light absorption characteristics, can be easily controlled, without making remarkable changes to the materials and the amounts of the infrared absorbents to be added to the toners.

Finally, the measurement methods used in the above examples and comparative examples will be all described in the following.

[Fixativity Evaluation]

The evaluations of fixativity were carried out through a tape removing test that was conducted in the following manner. Adhesive tape (SCOTCH MENDING TAPE, manufactured by 3M Corp.) was lightly placed onto a fixed image. A cylindrical block was then rolled on the fixed image in the circumferential direction, so that the adhesive tape was bonded to the surface of the image with a linear pressure of 250 g/cm. After that, the adhesive tape was removed from the image. The fixing rate was the optical density ratio of the image after the tape removal to the image prior to the tape removal, as expressed by the following equation. Fixing rates of 70% or higher were considered to be acceptable.

Fixing rate (%) =

(Density of image after tape removal/Density of image prior to tape removal) × 100

Here, the optical density of each fixed image was the light absorptivity value of the greatest wavelength obtained by measuring the reflection light in the wavelength range of 400 nm to 800 nm by a spectrophotometer (CM-3700d, manufactured by Minolta Co., Ltd.).

Since the amount of toner varies on the recording medium, the fixing rate also varies on the recording medium. Therefore, the fixing rate (%) of each single toner layer having a toner layer weight of 0.70±0.05 g/cm² on the recording medium was measured in this evaluation.

The toner layer weights of stacked toner layers have already been mentioned in Examples.

[Melt Viscosity]

The melt viscosities and melt elasticity rates were measured by a cone-plate dynamic viscoelasticity meter (MR3 SOLIQUIDMETER, manufactured by Rheology K. K.) in a nitrogen atmosphere at a rising temperature from 50° C. to 250° C. at a temperature rising speed of 10° C./min. Here, the frequency was 0.5 Hz.

[PAS Level]

Each toner was placed on a stainless steel plate, and a PAS measuring unit (Photoacoustic Model 300, manufactured by MTEC Corporation) was set. After the atmosphere was replaced with He gas under conditions of 10 ml/s and 10 s, the PAS level was measured by an FT·IR (manufactured by Mattson Technology Inc.) in the following manner. The infrared PAS spectrum was determined and then integrated in the wavelength range of 800 nm to 2000 nm, with the number of integration times being 200. As a reference material, powder carbon black was used, and the PAS level was determined as a relative value to the PAS level of the powder carbon black, which was set at 1.

[Covering Power]

A pigment (an infrared absorbent) of 5 g was mixed with a vinyl chloride-vinyl acetate copolymer solution of 95 g, and was dispersed by a paint shaker for 1 hour. The pigment dispersion solution was uniformly applied to a polyester film of 100 μm in thickness by a bar coater, so that the thickness of the polyester film after drying was 20 μm. The composition of the vinyl-chloride vinyl-acetate copolymer solution was as follows:

| | |
|---|---|
| 1) vinyl chloride-vinyl acetate copolymer | 12 g |
| 2) ethylacetate | 19 g |
| 3) MIBK (methyl-isobutyl ketone) | 25 g |
| 4) MEK (methylethyl ketone) | 39 g |

Samples of the dried polyester film to which the pigment dispersion solution had been applied were evaluated by the covering power testing paper method specified by JIS/K5101.

The samples were attached to a white paper sheet having a reflection rate of 80±1) and a black paper sheet having a reflection rate of 2 or lower, both paper sheets being specified by JIS/K5101. The lightness of each sample was measured by a spectrophotometer (CM-3700d, manufactured by Minolta Co., Ltd.), and the covering power was determined from the following equation:

Covering power(%)=(LB/LW)×100 wherein LB represents the lightness on the black paper sheet, and LW represents the lightness on the white paper sheet.

It should be noted that the present invention is not limited to the embodiments specifically disclosed above, but other variations and modifications may be made without departing from the scope of the present invention.

The present application is based on Japanese Priority Application No. 2002-097182 filed on Mar. 29, 2002, the entire contents of which are hereby incorporated by reference.

What is claimed is:

1. An image forming method using flash-fixable color toners, each of the color toners comprising a binder resin, a coloring agent, and an infrared absorbent, wherein the method comprising the steps of:

initially forming an image on a recording medium using a first toner and flash-fixating the image of the first toner; and repeatedly forming an image on the recording medium using an nth toner and flash-fixating the image of the nth toner, wherein each of the formed and flash-fixated images of the first toner through the nth toner satisfies the following relationship:

$$4950 \leq \rho_{X-1}/(E_{X-1} \cdot S_{X-1}) \geq \rho_X/(E_X S_X) \geq 1150$$

and $$E_{X-1} \geq E_X$$

where "$S_X$" represents a PAS level of the nth toner, X being an integer of 2 to n "$\rho_X$" represents a melt viscosity of the nth toner at a reference temperature, "$E_X$" represents an energy of a flash light used for fixing the image of the nth toner, "$S_{X-1}$" represents a PAS level of the (n−1)th toner, "$\rho_{X-1}$" represents a melt viscosity of the (n−1)th toner at a reference temperature, "$E_{X-1}$" represents an energy of a flash light used for fixing the image of the (n−1)th toner.

2. An image forming method as claimed in claim 1, wherein
each of the color toners comprises at least one infrared absorbent that is insoluble in the binder resin, and
the specific surface area Su of the infrared absorbent added to the (n−1)th and nth toners satisfies the following relational expression:

$$Su_{n-1} \geq Su_n.$$

3. An image forming method using flash-fixable color toners, each of the color toners comprising a binder resin, a coloring agent, and an infrared absorbent, wherein the method comprising the steps of:
initially forming a first image of a first toner on a recording medium;
secondary forming a second image of a second toner on the recording medium;
subsequently forming an nth image of an nth toner on the recording medium; and
finally flash-fixating the first image through the nth image, wherein the first toner through nth toner images have the following relationship:

$$4000 \geq \rho_Y/(S_Y \cdot E) \geq 1000$$

where "Y" represents a Yth toner image counted from the side of the recording medium, "$S_Y$" represents a PAS level of the toner of the Yth toner image, "$\rho_Y$" represents a melt viscosity of the toner of the Yth toner image at a reference temperature, and "E" represents an energy of a flashlight used in flash fixing.

4. An image forming method as claimed in claim 3, wherein
each of the color toners comprises at least one infrared absorbent that is insoluble in the binder resin, and
the specific surface area Su of the infrared absorbent added to the (n−1)th and nth toners satisfies the following relational expression:

$$Su_{n-1} \geq Su_n.$$

5. An image forming method using flash-fixable color toners, each of the color toners comprising a binder resin, a coloring agent, and an infrared absorbent, wherein the method comprising the steps of:
forming n toner layers on a recording medium; and
flash-fixing the n toner layers formed on the recording medium, where the flash-fixated toner layers have the following relationship:

$$S_{Z-1} \geq S_Z \text{ and } C_{Z-1} \geq C_Z$$

where "Z" represents a Zth toner layer counted from the side of the recording medium, "$S_Z$" represents a PAS level of the toner of the Zth toner layer, "$C_Z$" represents a covering power of the Zth toner layer.

* * * * *